(12) United States Patent
Bilstad et al.

(10) Patent No.: US 11,906,649 B2
(45) Date of Patent: Feb. 20, 2024

(54) SYSTEMS AND METHODS FOR PRECISE RADIO FREQUENCY LOCALIZATION OF WIRELESS NODES INCLUDING A WIRELESS ARBITRARY DEVICE USING TIME DIFFERENCE OF ARRIVAL

(71) Applicant: ZaiNar, Inc., Redwood City, CA (US)

(72) Inventors: Mark Bilstad, Los Altos, CA (US); Tommi Ylamurto, Los Gatos, CA (US); Manu Seth, Berkeley, CA (US)

(73) Assignee: ZaiNar, Inc., Redwood City, CA (US)

( * ) Notice: Subject to any disclaimer, the term of this patent is extended or adjusted under 35 U.S.C. 154(b) by 238 days.

(21) Appl. No.: 17/371,987

(22) Filed: Jul. 9, 2021

(65) Prior Publication Data
US 2023/0009717 A1   Jan. 12, 2023

(51) Int. Cl.
| | | |
|---|---|---|
| G01S 5/10 | (2006.01) | |
| G01S 5/02 | (2010.01) | |
| H04W 64/00 | (2009.01) | |
| H04W 84/12 | (2009.01) | |

(52) U.S. Cl.
CPC ............... *G01S 5/10* (2013.01); *G01S 5/0284* (2013.01); *H04W 64/006* (2013.01); *H04W 84/12* (2013.01)

(58) Field of Classification Search
CPC . G01S 5/10; G01S 5/0284; G01S 5/02; G01S 5/0205; G01S 5/017; G01S 5/02216; G01S 5/06; H04W 64/006; H04W 84/12
See application file for complete search history.

(56) References Cited

U.S. PATENT DOCUMENTS

| | | | |
|---|---|---|---|
| 10,349,371 B2 * | 7/2019 | Park | H04W 64/00 |
| 10,779,126 B2 * | 9/2020 | Kumar | G01S 1/0428 |

\* cited by examiner

*Primary Examiner* — Kabir A Timory
(74) *Attorney, Agent, or Firm* — Run8 Patent Group, LLC; Peter Miller

(57) ABSTRACT

In one embodiment, an asynchronous wireless system for localization of nodes comprises a first wireless node being configured to receive a first communication from a third wireless node having an unknown location, to determine time difference of arrival (TDoA) information of the reception of the first communication between each of the first and a second wireless node, to determine TDoA ranging including a relative or absolute position of the third wireless node using the time difference of arrival information, and to synchronize the first and second wireless nodes based on a second communication with the synchronization being decoupled in time from the first communication. In another embodiment, a computer implemented method comprises receiving, with first and second wireless anchor nodes, packets from a wireless arbitrary device and performing time difference of arrival ranging upon reception of the packets between each of the first and the second wireless anchor nodes.

9 Claims, 15 Drawing Sheets

SYSTEM 100

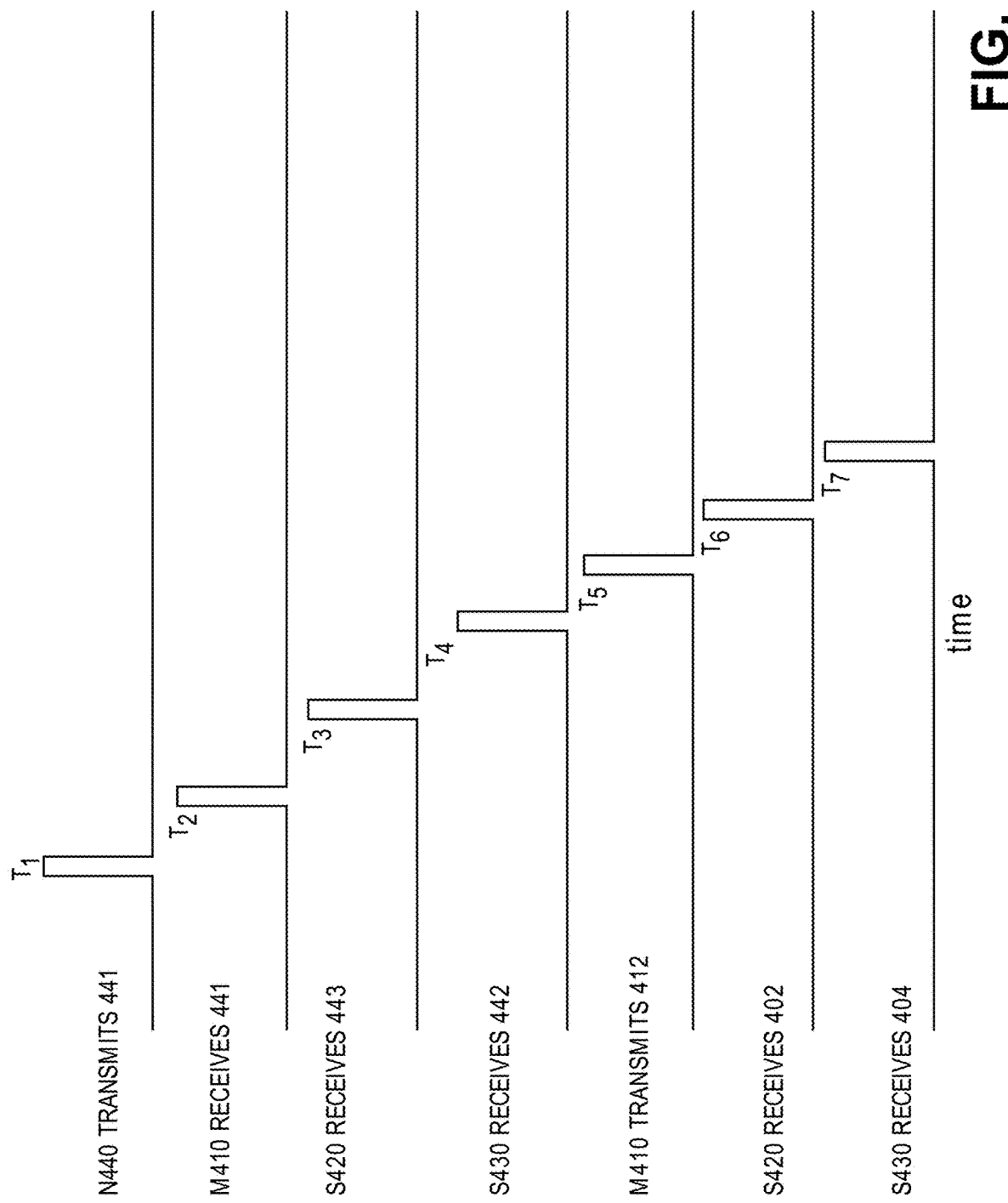

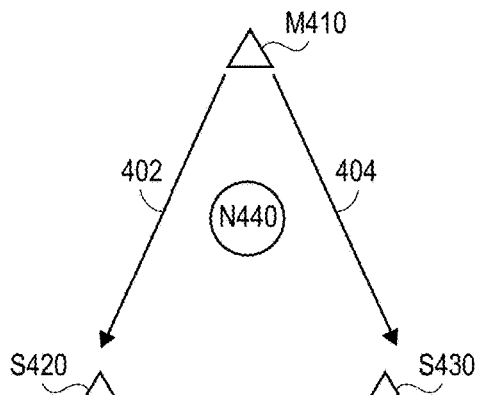
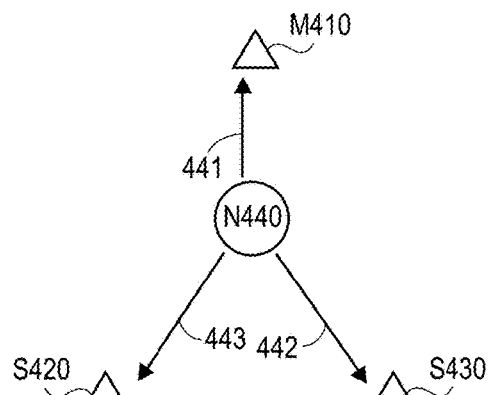
FIG. 3A      FIG. 3B
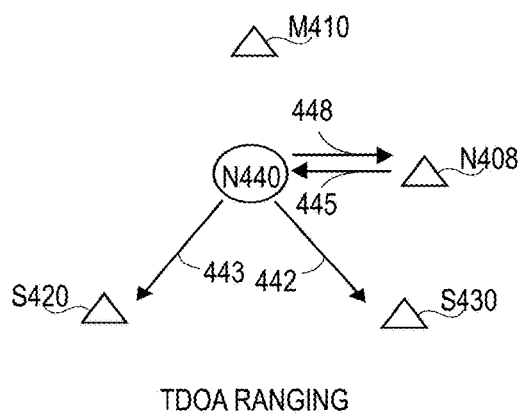
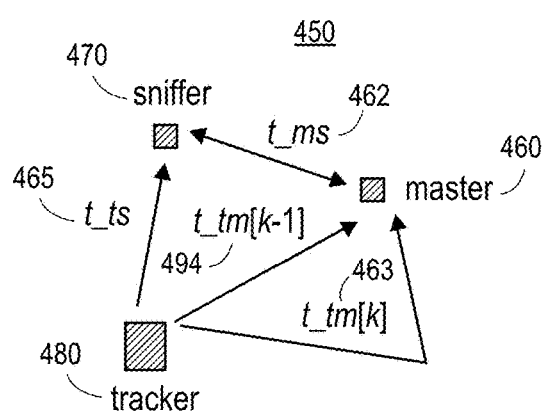
FIG. 3C      FIG. 4A
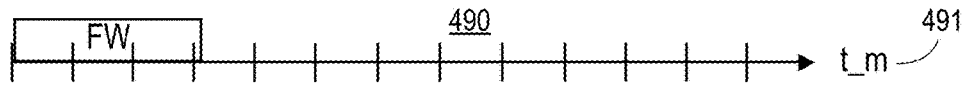
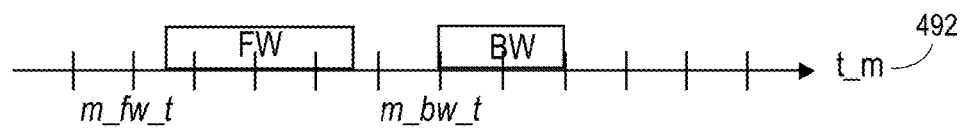
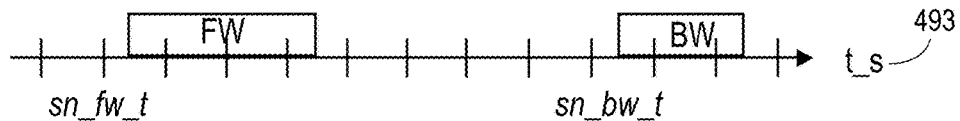
FIG. 4B

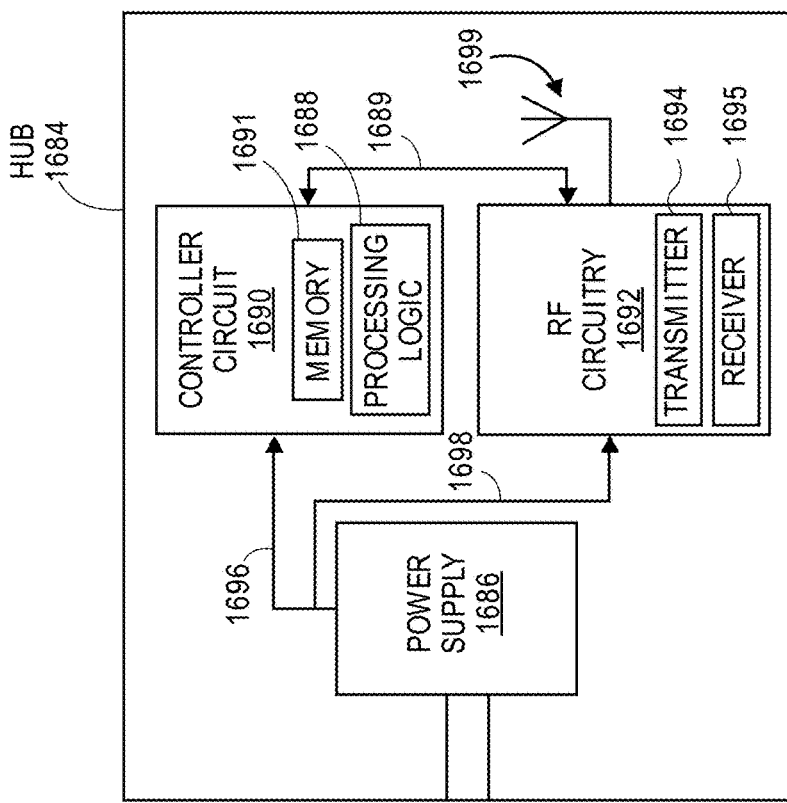
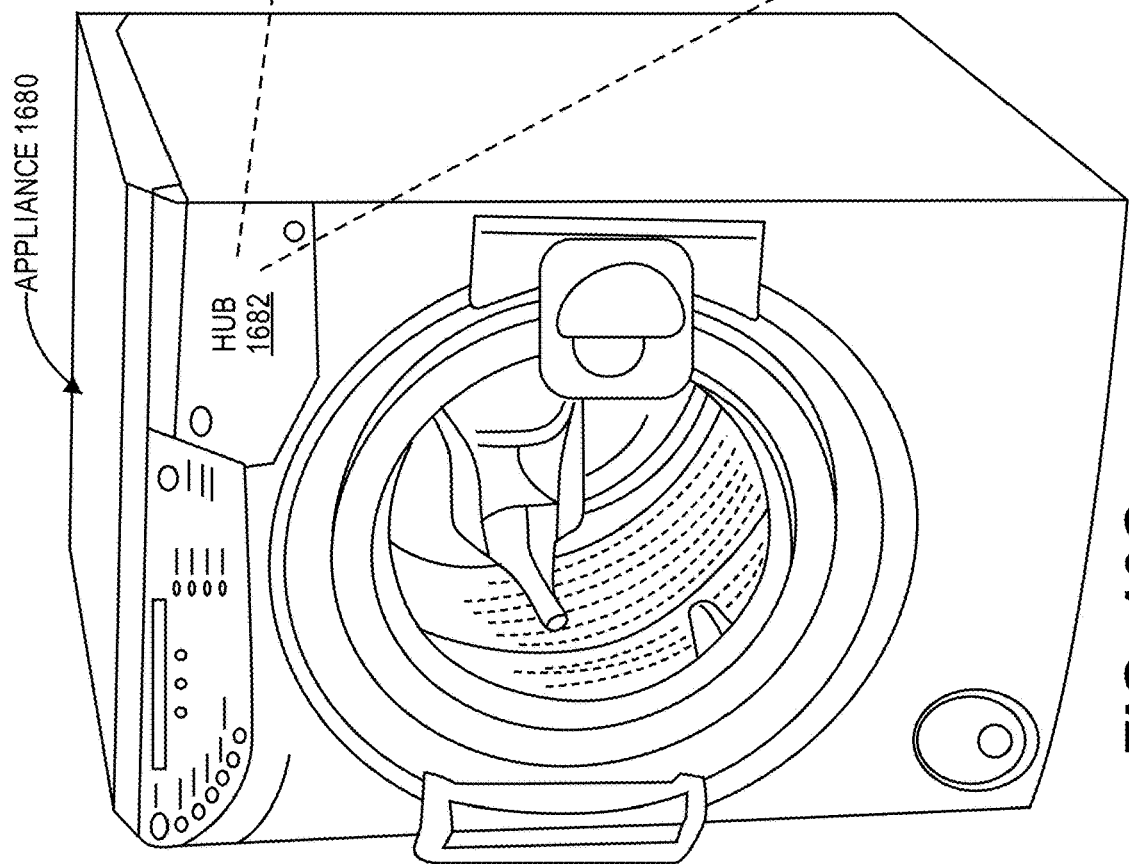
FIG. 10D
FIG. 10C

SYSTEMS AND METHODS FOR PRECISE RADIO FREQUENCY LOCALIZATION OF WIRELESS NODES INCLUDING A WIRELESS ARBITRARY DEVICE USING TIME DIFFERENCE OF ARRIVAL

RELATED APPLICATIONS

This application is related to U.S. Pat. Nos. 10,568,064, 10,660,060, 10,772,067, 10,757,675, and U.S. application Ser. No. 16/283,465, which are incorporated by reference herein.

FIELD

Embodiments of the invention pertain to systems and methods for precise radio frequency localization using time difference of arrival information and also decoupling synchronization of wireless nodes from the ranging.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on time difference of arrival (TDoA) technique for multilateration is performed using radio frequency measurements for determining location of wirelessly equipped objects in three dimensional space. RF-based localization may be performed in numerous ways. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. In TDoA, one node transmits a signal. Multiple other nodes receive the signal, either by directly receiving it as a target of the communication or by sniffing the communications between other pairs of nodes, and the time difference between reception at each receive node is calculated. TDoA requires synchronization of the receivers of the nodes to accurately measure the difference in receive times. This can be done by operating all of the receivers on a shared clock and comparing absolute timestamps. In wireless systems where a shared clock is not available, the receivers must be synchronized in another way. The synchronization may be coupled to the TDoA operation, or may be maintained as an independent operation, since synchronization may not need to be performed frequently in situations when the individual clocks are relatively stable. Additionally, various estimations must be performed to use the RF communications to estimate the RF signal travel times and hence distances between the various nodes. This can be performed in various ways, including using estimations of the various channel states between the nodes.

SUMMARY

Embodiments of the invention pertain to wireless systems having wireless nodes and methods for precise radio frequency localization using time difference of arrival information. Synchronization of wireless nodes is decoupled from the localization. In one embodiment, an asynchronous wireless system for localization of nodes in a wireless network architecture comprises first and second wireless nodes with at least one wireless node having a known location and including a wireless device with one or more processing units and RF circuitry for transmitting and receiving communications in the wireless network architecture and a third wireless node having an unknown location and including a wireless device with RF circuitry to enable communications with the first and the second wireless nodes in the wireless network architecture. The one or more processing units of the first wireless node are configured to execute instructions to receive a first communication from the third wireless node, to determine time difference of arrival (TDoA) information of the reception of the first communication between each of the first and the second wireless nodes, to determine TDoA ranging including a relative or absolute position of the third wireless node using the time difference of arrival information, to send a second communication with a synchronization packet received by the second wireless node, and to synchronize the first and second wireless nodes based on the second communication with the synchronization of the first and second wireless nodes being decoupled in time from the first communication.

In another embodiment, a computer implemented method for localization of a wireless arbitrary device in a wireless network architecture, comprises initializing the wireless network architecture having first and second wireless anchor nodes and a plurality of wireless sensor nodes, preparing, with the plurality of wireless anchor nodes, for localization of the wireless arbitrary device that performs wireless local area network (WLAN) active scanning or maintains a WLAN association to any node. The method further includes receiving, with the first and second wireless anchor nodes, packets from the wireless arbitrary device and performing time difference of arrival (TDoA) ranging upon reception of the packets between each of the first and the second wireless anchor nodes.

Other features and advantages of embodiments of the present invention will be apparent from the accompanying drawings and from the detailed description that follows below.

BRIEF DESCRIPTION OF THE DRAWINGS

FIG. 2 illustrates a timing diagram for communications of the wireless system 100.

FIG. 3A illustrates a wireless architecture for synchronization of wireless nodes while FIG. 3B illustrates a decoupling in time of the TDoA ranging from the synchronization in accordance with one embodiment.

FIG. 3C illustrates a wireless architecture of wireless nodes in another embodiment in which other nodes (e.g., node 408 (N408)) have direct communication (e.g., 445, 448) with the node N440.

FIG. 4A illustrates implementation of a TDoA wireless system in accordance with another embodiment.

FIG. 4B shows a timing diagram for the TDoA wireless system in accordance with another embodiment.

FIG. 10C shows an exemplary embodiment of a hub implemented within an appliance (e.g., smart washing machine, smart refrigerator, smart thermostat, other smart appliances, etc.) in accordance with one embodiment.

FIG. 10D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
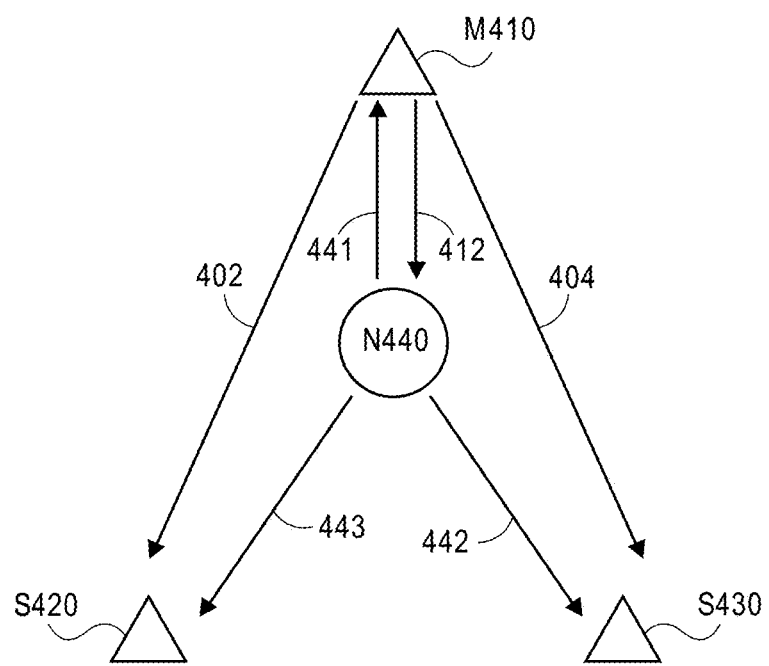
FIG. 1 shows an archetypical example of a use of time difference of arrival to determine the location of an object.

Systems and methods for determining location of wireless sensor nodes using radio frequency communications between the nodes and various RF-enabled devices are described herein. Time difference of arrival is combined with techniques to mitigate the effect of multipath issues and to overcome sampling and synchronization limitations to facilitate highly precise determination of location.

In various applications of wireless sensor networks, it may be desirable to determine the location of sensor nodes within the network. For example, in wireless sensor networks, knowledge of location can add context to sensed data. In one example, knowledge of location in temperature sensing networks can enable mapping of temperature variations. Thus, it is desirable for systems and methods to enable location detection of nodes in wireless networks. Determination of location may be used to facilitate such applications as asset tracking, location context-based marketing and information, indoor navigation, and improved connectivity provisioning and configuration. While GPS delivers reasonable location services in clear outdoor environments, indoor location services remain inadequate today.

RF-based location services typically make use of one or more RF transceivers in known locations (often called "anchors") and a target object with an unknown location that is to be determined. RF communications are performed between the anchors and the target object and the location is determined based on these communications. The overall process is typically described in two operations—ranging and triangulation. In the ranging operation, RF communication is performed between an anchor and the object to determine the distance between the anchor and the object. This is repeated for multiple anchors to obtain a set of ranges. These are then used in the triangulation operation to determine the position of the object in three dimensional space. Typically, sufficient anchors are used to allow for some error reduction through redundancy in the triangulation process. The overall process is therefore based on the time of arrival between the object and the various anchors. In an alternate methodology, rather than requiring individual communications between the object and the various anchors, time difference of arrival may be used. In this approach, direct communication occurs between the object and one master anchor or with a third party device. These communications are also received by other devices (e.g., anchor devices), called sniffers, with known or estimated relative positions to the master. The differences in time of arrival of the communications at the various sniffers, the master, and the object can then be used to estimate the location of the object. This has the advantage of reducing the number of overall communications needed. It may also exploit existing communication (e.g., standard WiFi association and communication packets) without requiring significant alteration or augmentation of the communication methodology. Any of the wireless nodes described herein can be part of a wireless network architecture that is used for localization or can be third party devices that also communicate with the wireless network architecture.

The accuracy of a location service is typically provided as a numerical measure of the position as determined by the service versus the actual physical location. In particular, location services in indoor environments are often prone to outliers, where a few location determinations may be significantly erroneous, despite the fact that many measurements deliver good accuracy. As a consequence, while a quoted numerical accuracy may appear to be sufficient for a given application, in fact, the outliers may make the effective reliability of the localization so poor as to be unusable in practice.

Depending on the application, the time to achieve location estimation may be an important parameter as well. For example, real time indoor navigation services may require responsiveness of a single second or less to enable accurate navigation guidance. Asset tracking or context-based services, on the other hand, may be provided with slower location services.

The range of a location service describes the maximum distance over which location can be determined. In an RF-based location system, this characterizes the maximum separation between the minimum number of anchors to achieve location service functionality and also the separation between these anchors and the target object to be located. Obviously, the greater the range, the more sparse the location infrastructure requirements, reducing cost of deployment.

Indoor environments are typically difficult environments for RF-based location services. In particular, the ranging or angle determination process that is used as the first operation in localization is particularly sensitive to reflections that commonly exist in indoor environments. These reflections result in multiple paths forming for the RF signal to propagate between the communicating radios on the anchor(s) and the object. This so-called multipath problem can result in erroneous determination of signal strength, range or angle.

For example, if a path that includes a reflection is misidentified as the range between an anchor and the object, it results in an overestimation of the range versus a direct path. This can then result in errors in triangulation. Indoor location services are highly prone to these multipath effects, leading to outliers, where certain locations result in very large errors. Any robust indoor location service must correctly deal with these multipath effects to deliver good accuracy with minimal outliers.

In addition to multipath effects, attenuation of signals can be a serious problem as well. RF signals are generally attenuated more strongly in indoor environments due to absorption of signals by walls, etc. This in turn can directly introduce error in the measurements, or, at the very least, can reduce the effective range of the system, necessitating the use of more anchors. If the anchor cost is high, this can significantly impact cost of deployment.

Finally, the overall cost of deployment can be a serious challenge. Given the range and multipath concerns with indoor environments, multiple anchors are commonly needed to provide adequate error correction and provide sufficient indoor coverage given the increased attenuation. Should these anchors require expensive hardware that is solely dedicated for location service provision, this can make the solution non-viable for cost of deployment reasons alone.

Exemplar prior indoor localization technologies can be subdivided into a few main categories based on their choice of frequency/protocol. These include those based on 2.4 GHz ZigBee solutions, those based on 2.4 GHz Bluetooth solutions, those based on WiFi (e.g., sub GHz, 2.4 GHz, 5 GHz, 6 GHz) and those based on Ultra-wide band (UWB) at >5 GHz. In addition to categorization based on frequency/protocol, such technologies can also be characterized based on their method of position determination. Position determination is typically achieved, for example, using one or more of signal strength (RSSI), angle of arrival (AOA), time of arrival (TOA), or time difference of arrival (TDoA).

In Time of arrival (TOA) and time difference of arrival (TDoA) systems, the time for a signal to propagate from a transmitter to a receiver (or to a master and sniffers for TDoA) is used to estimate distance between the same. Since the speed of propagation is relatively fixed, such systems are much more robust than RSSI-based systems, and also do not require the antenna sophistication of AOA systems. On the other hand, such systems too are susceptible to multipath effects, since a dominant reflected signal will have a longer time of arrival that a weaker direct path, and, if selected as the distance, may cause significant error in the position calculation. Additionally, since time is the measured parameter, such systems are heavily affected by the sampling clock accuracy of the time measurement system, and also show a strong dependence on the signal bandwidth; wider bandwidth systems typically show much better multipath tolerance, reduced outliers, and overall improved accuracy.

Location information may be used to estimate the relative position of sensors such as security cameras, motion sensors, temperature sensors, and other such sensors as would be apparent to one of ordinary skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

U.S. Pat. No. 10,568,064, which is incorporated by reference herein, discloses various systems and methods for using time difference of arrival to estimate the location of an object. FIG. 1 illustrates a wireless system for localization of nodes utilizing time difference of arrival information. The wireless system 100 is configured to have one master node 410 (M410), one node 440 at unknown location (N440), and sniff nodes (e.g., S420, S430, etc.). FIG. 1 shows an archetypical example of a use of time difference of arrival to determine the location of an object.

Here, N440 represents the object to be detected. This is often referred to as a tracker (or tracker device). There are 3 devices with known locations shown, M410, S420, and S430. M is used to denote a master, which handles the direct communications with the node N440. S is used to denote sniffers, which do not explicitly communicate with the node N440 but listen to the communications between the node N440 and the master M410. Bidirectional communication is established between N440 and M410, as denoted by 441 and 412. This communication was used to determine the distance between N440 and M410 using various possible techniques to estimate an accurate transit time between the same. Various such techniques are disclosed in U.S. Pat. No. 10,757,675 and U.S. patent application Ser. No. 16/283,465 and can be applied here, as would be apparent to one of ordinary skill in the art. In TDoA, the absolute distance between N440 and M410 does not necessarily get directly calculated. The data can be combined to determine the final location. The communication from the node N440 was also sniffed by the sniffers, as represented by communications 442 and 443. Anchor synchronization is needed to enable determination of the various transit times. This is achieved by synchronization communication 402 and 404 (and also 412 between M410 and N440) between M410 and S420 and S430 respectively. Using the various extracted timing, the transit times between the node and the various anchors M410, S420, and S430 can be determined. Additional anchors can also participate, as would be apparent to one of ordinary skill in the art. If the location of some or all of the anchors is known, or the relative positions are known, then the absolute or relative position of the node can be calculated through a triangulation process. Various methods to achieve this are disclosed in U.S. Pat. No. 10,757,675 and U.S. patent application Ser. No. 16/283,465 and can be applied herein, as would be apparent to one of ordinary skill in the art.

For example, based on two transmit and receive time stamps between two wireless nodes, an average time of flight between these nodes can be estimated. This process can be repeated multiple times and at multiple frequencies to improve precision and to eliminate or reduce degradation due to poor channel quality at a specific frequency. A set of path lengths can be estimated by repeating this process for various node pairs. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication only and only time of flights between the nodes and the hub are measured periodically. Provided these time of flights are held relatively constant, the network then assumes nodes have not moved and does not waste energy attempting to re-run mesh-based localization. On the other hand, when a change in path length in the tree network is detected, the network switches to a mesh-based system in combination with tree-like network and re-triangulates to determine location of each node in the network.

In one embodiment, a Location Algorithm includes anchor-based Triangulation. In an anchor-based system, the location of anchor nodes (e.g., hubs, sensors, devices, etc.) is known. The unknown location of other devices is calculated based on the known location of the anchors as well as the measured distance between each device and each anchor. The location of these unknown devices is calculated one by one with the same procedure. For each of the devices, the distance $d_i$ to anchor i is:

$$(t_i - t_{tracker})c = d_i = \sqrt{(x - x_i)^2 + (y - y_i)^2 + (z - z_i)^2} + n_i$$

where $x_i$, $y_i$, and $z_i$ are the coordinates of the ith anchor; $t_i$ is the receive time stamp, c is the speed of light; x, y, z and $t_{tracker}$ are the coordinates and the transmit time of the unknown device, which is the goal of the estimation. By setting up a different error function, $n_i(x, y, z, x_i, y_i, z_i)$, for the distance measurement, one can use least square errors to estimate the location of the unknown device (x,y,z).

In another embodiment, for an Anchor-less Triangulation setup, there is no known location for any of the devices. The algorithm has to use the distance measurement between pairs of the devices to determine the relative location of each device. The goal is to find out the relative location of all devices to minimize the overall error of the distance measurement. There are multiple types of algorithms including an incremental algorithm and a concurrent algorithm. An incremental algorithm starts with a small set of devices and calculates their locations based on distance measurement. The small set of devices is then used as anchor nodes for other devices. It is a simple algorithm but with the drawback that the error in early calculated nodes can be easily propagated to the later nodes, even with an advanced algorithm which updates location of the early nodes.

A concurrent algorithm solves the issue of the incremental algorithm due to the concurrent algorithm estimating all locations at the same time to achieve a global optimum with lower error than incremental algorithm. It usually uses iterative process to update the location of the devices, therefore it will take a longer time to converge while using more computation power and memory.

FIG. 2 illustrates a timing diagram for communications of the wireless system 100. The unknown node N440 can initiate the packet transaction. N440 sends a communication 441 (e.g., forward packet 441) to the master (M) node 410 at time $T_1$. The master node 410 receives the communication 441 at time $T_2$. The master node 410 responds with a communication 412 (e.g., an acknowledgement packet 412) at time $T_5$. The sniff nodes 420 and 430 listen to the communications 442-443 at times $T_4$ and $T_3$ (e.g., forward packets 442-443) from N440 and the communications 402 and 404 (e.g., acknowledgement packet 402 and 404) from the master node 410. The sniff node 420 receives the communication 443 at time $T_3$ and receives the communication 402 at time $T_6$. The sniff node 430 receives the communication 442 at time $T_4$ and receives the communication 404 at time $T_7$. The received packets 441-443 originate from the same communication from N440.

The TDoA is now calculated based on the arrival of the forward packets at the master and sniff nodes from N440. The packet transmission time of the acknowledgement packets from the master node is now used to align the timing between the nodes in accordance with Equation 1 below with delta offset equaling $T_6 - T_5 - T_{oF\ M410-S420}$:

$$T_{DoAM410-S420} = T_2 - T_3^{M410}$$

$$= T_2 - T_3 - \text{delta offset between clocks of } M410 \text{ and } S420$$
$$= (T_2 - T_3) + T_6 - T_5 - T_{oFM410-S420}$$
$$= \frac{(T_{2sample} + T_{2frac} - T_{3sample} - T_{3frac}) +}{T_{6sample} + T_{6frac} - T_{5sample} - T_{5frac} - T_{oFM410-S420}}$$

In one embodiment of the present invention, some or all of the synchronization transactions (e.g., communications 402, 404) can be decoupled from the ranging transactions (e.g., communications 441, 412, 442, 443). For example, since resynchronization may be needed relatively infrequently compared to the temporal need for ranging, the transactions that include communications 402 and 404 may be used only occasionally. This reduces network congestion and allows the ranging to be performed faster due to less frequent synchronization.

In another embodiment of the present invention, the node N440 may not directly communicate with the master M410, i.e., there may be other nodes (e.g., node 408 (N408)) involved that have direct communication (e.g., 445, 448) with the node N440 as illustrated in FIG. 3C, and the master may only be responsible for synchronization and direction of the overall system as illustrated in FIG. 3A.

FIGS. 3A and 3B show an embodiment of a system where the time synchronization is decoupled from the ranging measurements. In this case, the communication to N440 to trigger its outbound communication (e.g., communication 441-443) may come directly from M410 or may originate from S420, S430 or indeed, any other wireless device (e.g., N408) that is configured to participate. Alternatively, N440 may be "triggered" by internal sources, such as timers or sensors (e.g., motion sensor).

The decoupling of the TDoA ranging (FIG. 3B) from the synchronization (FIG. 3A) allows significant flexibility in the overall configuration of the wireless architecture and communication strategy, with various advantages based on the embodiment. FIG. 3A shows an archetypal implementation of synchronization transactions between a master M410 and sniffers S420 and S430. There may be additional sniffers, as would be apparent to one of ordinary skill in the art.

For achieving synchronization between M410 and sniffers S420, S430, time of transmission (TX) and reception (RX) timestamps and channel state information (CSI) are captured on synchronization (or herein after referred to as "sync") packets of communication 402 and 404 and are used to determine clock drift, using time determination techniques as described in U.S. Pat. No. 10,757,675 and U.S. patent application Ser. No. 16/283,465, or other such techniques as would be apparent to one of ordinary skill in the art. In the new method of synchronization, a synchronization packet sent by one or more devices (that may or may not be a master) is received by the sniffers S420, S430 and is used to correct for the phase/frequency offset between the nodes. This synchronization packet can be an explicit synchronization packet or can just be an acknowledgement to a packet sent from the mobile node to one of the other nodes. Absolute phase difference at the time of sync and the rate of change of the phase difference is used to interpolate to the phase difference at the time of TDoA.

Anchor clocks are often reasonably stable, so synchronization can be done less frequently than ranging measurements yet still maintain benefits of many redundant sync measurements under different channel conditions; sync can also apply to multiple trackers. Additionally, in the case where anchor coordinates are known, direct ranging between anchors is not required and synchronization may be achieved using the known locations.

In another embodiment, a TDoA system utilizing known anchor locations may be implemented. Aspects of this are illustrated in FIG. 4A. In FIG. 4A, the master node 460 is a wireless device that receives forward direction multicarrier packets and transmits backward direction multicarrier packets. In one example, the sniffer node 470 is a wireless device that only receives unidirectional or broadcast multicarrier packets in this context, and the tracker is a wireless device 480 that transmits forward direction multicarrier packets. The line-of-sight signal travel time between the master node 460 and the sniffer node 470 is defined as t_ms 462. The signal travel times from the tracker 480 are not known and the TDoA operation is used to estimate signal travel times to the sniffer and to the master as t_ts 465 and t_tm[k−1] 494 and t_tm[k] 463, respectively. In case of multipath channel conditions there is more than one estimate candidate.

When the tracker 480 transmits a forward packet, the master node 460 receives the forward (FW) packet and starts filling its multicarrier training symbol with known content (e.g., WiFi long training field (LTF)) into a buffer (e.g., FFT buffer for FFT analysis) at clock cycle m_fw_t as showing in timing diagram 500 of FIG. 4B. The timing diagram 490 shows timing for packets received at the master node with timing diagrams 491, 492 and packets received at the sniffer node with timing diagram 493. The sniffer 470 receives the same packet and starts filling the LTF into a buffer (e.g., FFT buffer for FFT analysis) at clock cycle sn_fw_t. When the master node 460 transmits a backward packet with its LTF starting at time m_bw_t then the sniffer receives it and starts filling the LTF into its FFT buffer at clock cycle s_bw_t. Due to the discrete nature of the clock and the inaccuracy of packet detection, the receiver clock time stamps do not align with the actual start of the symbol. Thus, any ranging methods based solely on these time stamps will be inferior compared to the techniques introduced here. All the time stamps are based on the receivers' own clocks and the sniffer clock differs from the master node clock by time varying offset phi(t). The sniffer receiver measures and reports a frequency offset that can be translated into the rate, m, at which phi(t) is changing. The clock offset typically follows linear behavior phi(t)=m·t+phi_0 if the offset measurement is done frequently enough.

For symbol equalization purposes the master node estimates the forward frequency domain channel from the training symbols as channel state information csi_m_fw and the sniffer as csi_s_fw. The sniffer estimates the backward channel as csi_s_bw. These channel estimates can also include the transmitter and receiver involved. Since transceivers can have hundreds of nanoseconds delay, and we are only interested in time of flight over the air, it is preferred to remove any known transceiver response by, e.g., dividing the channel response by the transceiver response. One way to measure the transceiver response is to feed back the signal from the transmitter to the receiver and save that channel state information. The determined sorted delay values of time domain versions of those channels are defined as m_fw_d[ ], s_fw_d[ ] and s_bw_d[ ], respectively. Examples of methods for creating these time domain channel vectors can include FFT, Matrix Pencil, Sparse Approximation, MUSIC, as discussed in U.S. patent application Ser. No. 16/283,465, U.S. Pat. No. 10,757,675, and other such techniques as would be apparent to one of ordinary skill in the art. In one embodiment, the vectors may be shortened to length k and j as m_fw_d[i_m_fw−k, i_m_fw−k+1 . . . , i_m_fw], s_fw_d[i_s_fw−k, i_s_fw−k+1 . . . , i_s_fw] and s_bw_d[i_s_bw−j, i_s_bw−j+1 . . . , i_s_bw], where i_m_fw, i_s_fw and i_s_bw are the indices of the strongest paths.

A set of phi estimates are defined as phi=t_ms−s_bw_t+m_bw_t−s_bw_d[ ]. Since we know that phi(t)=m·t+phi_0 then it is possible to pick which s_bw_d[ ] items have a match (e.g., match best) with the extrapolated phi from the historical data. This can potentially lower the count, j, even down to one (i.e., provide a unique solution).

If the channel between the master and the sniffer is unknown, in one embodiment, it is possible to proceed as follows:

It is possible to estimate k·j signal travel time candidates from tracker to sniffer as t_ts[ ]=s_fw_t+s_fw_d[ ]⊕s_bw_d[ ]+t_ms+s bw_t·(m−1)−m_bw_t−t_sn(state_s), where ⊕-operator creates a vector with all k·j sums of every possible path delay combinations. For example, in f=x⊕y, f[i]=x[mod(i,len(x))]+y[mod(I,len(x))+floor(i/len(x)]. t_sn is a known additional delay in the sniffer receiver caused by gain etc state changes.

Then, k signal travel time candidates from tracker to master may be estimated as t_tm[ ]=m_fw_t+m_fw_d[ ]−trx_m(state_m), where trx_m(state) is a known combined delay of the master transmitter and receiver. If the full transceiver response is known and corrected in the channel state information (csi_m_fw, csi_s_fw and csi_s_bw) then only the additional delay due to gain etc state change is applied.

Finally, j·k^2 travel time difference candidates may be estimated as t_ts[ ]⊕(−t_tm[ ]). These candidates can be used in TDoA multilateration.

If there is a known master-sniffer channel, then, in one embodiment, it is possible to proceed as follows:

It is possible to define phi(t) with linear equation m·t+phi_0. If the channel, csi_ms, between the master and sniffer is known then it is possible to define the ratio csi_s_bw/csi_ms as a circle that goes around origin r times. For signal with bandwidth of BW, it is possible to model phi(t) as m_bw_t−s_bw_t−r/BW for various packets and then estimate m and phi_0. Alternatively, m is also available from the sniffer receiver.

Then, to implement TDoA ranging, it is possible to estimate k signal travel time candidates from tracker to sniffer as ts_t[ ]=s_fw_t+d_s_fw[ ]+phi_0+m·m_bw_t. It is further possible to estimate k signal travel time candidates from tracker to master as tm_t[ ]=m_fw_t+d_m_fw[ ]. Finally, it is possible to estimate 102 travel time difference candidates as ts_t[ ]⊕(−tm_[ ]). These candidates can be used in TDOA multilateration.

It is usually beneficial to have as few travel time candidates as possible. If the location of the tracker is known to be within a certain physical space (i.e., a building), then the travel times have an upper and lower limit that can be calculated when the anchor locations are known. Any travel time candidate that is outside of these limits can be safely removed.

There are typically two (or more) locations that would give the same differential distance measurements. Many of the TDOA multilateration methods return both these locations as well as the transmit time of the forward packet (or clock offset between the master and the tracker). Some examples of multilateration methods are exhaustive search, Gauss-Newton, various closed form solutions or combination of those. If both locations are within the physical space where the tracker is known to be, then the correct location can be chosen by checking that the transmit time matches with the master location, tracker location and any known master receiver delay.

When more than one travel time candidate is used in multilateration then it is possible to give them weighting based on any a priori knowledge of the reliability of that candidate. This weight can be based on e.g. how far (in distance or index) the candidate path is from the strongest path, the path strength, the path distance, signal strength or anchor statistics. Many algebraic multilateration methods can add the weight through a matrix multiplication. In an exhaustive search method, the weight can also be made location specific. This can reduce sensitivity to the travel time estimation outliers that many Least Square Error solutions suffer from. It also allows taking into account any known geometry of the space, radio signal blockers or reflectors.

Sometimes the tracker can use multiple antennas either by switching between them or transmitting from both with intentional delay added to one. If multiple receive packets are averaged for noise reduction, then these cases must be identified first. In case of antenna switching, only packets from the same antenna can be averaged due to the channel differences between the antennas. If one antenna performs better than the other (based on signal to noise ratio, signal strength etc.) then the better antenna can be used instead of both. In case of one delayed antenna, the packets may need to be time aligned before averaging in case the receiver started sampling them from different parts of the packet. Also, in one example, any added antenna delay must be removed from the travel time estimates before multilateration.

Multiple anchors may transmit synchronization packets. In such an embodiment, there may be no need to designate a single anchor as the "master" (transmitting) role and the role of global timing reference management may change between the various anchors in an arbitrary manner or as needed by the application. In one embodiment, the choice of master may rotate based on the expectation of strongest signal strength or quality of communication based on past transactions and/or estimates of motion and/or location of the object being tracked.

In another embodiment, ranging activity may be used to trigger more sync interactions, in a loose coupling such that synchronization is triggered as needed.

In the ranging transactions as used in TDoA, Tracker (N440) can transmit any multicarrier (e.g., OFDM) packet to any destination address (e.g., a WiFi access point); nearby anchors will receive (sniff) this packet and can compute ranges using TDoA; (anchors have been previously maintaining time synchronization using any of the techniques disclosed herein, or other such techniques as would be apparent to one of ordinary skill in the art). FIG. 3B shows an archetypal ranging operation, where the node N440 sends communication to M410 (transaction 441), which is also sniffed by sniffers S420 (transaction 443) and S430 (transaction 442).

As disclosed in U.S. Pat. No. 10,757,675 and U.S. patent application Ser. No. 16/283,465 and would be apparent to one of ordinary skill in the art, wider bandwidth (>=80 Mhz) packets are preferred. However, narrower bandwidths can also be used, with less accuracy.

No direct interaction or protocols are needed between the tracker and anchors, assuming all are awake and tuned to the same channel; direct interaction can occur if desired. In one embodiment, an additional node N408 shown in FIG. 3C may be communicating with N440 directly, while M410, S420, and S430 may not have direct communication with N440 and may only be managing the overall set of operations and/or sniffing the transactions.

Figure 5A:
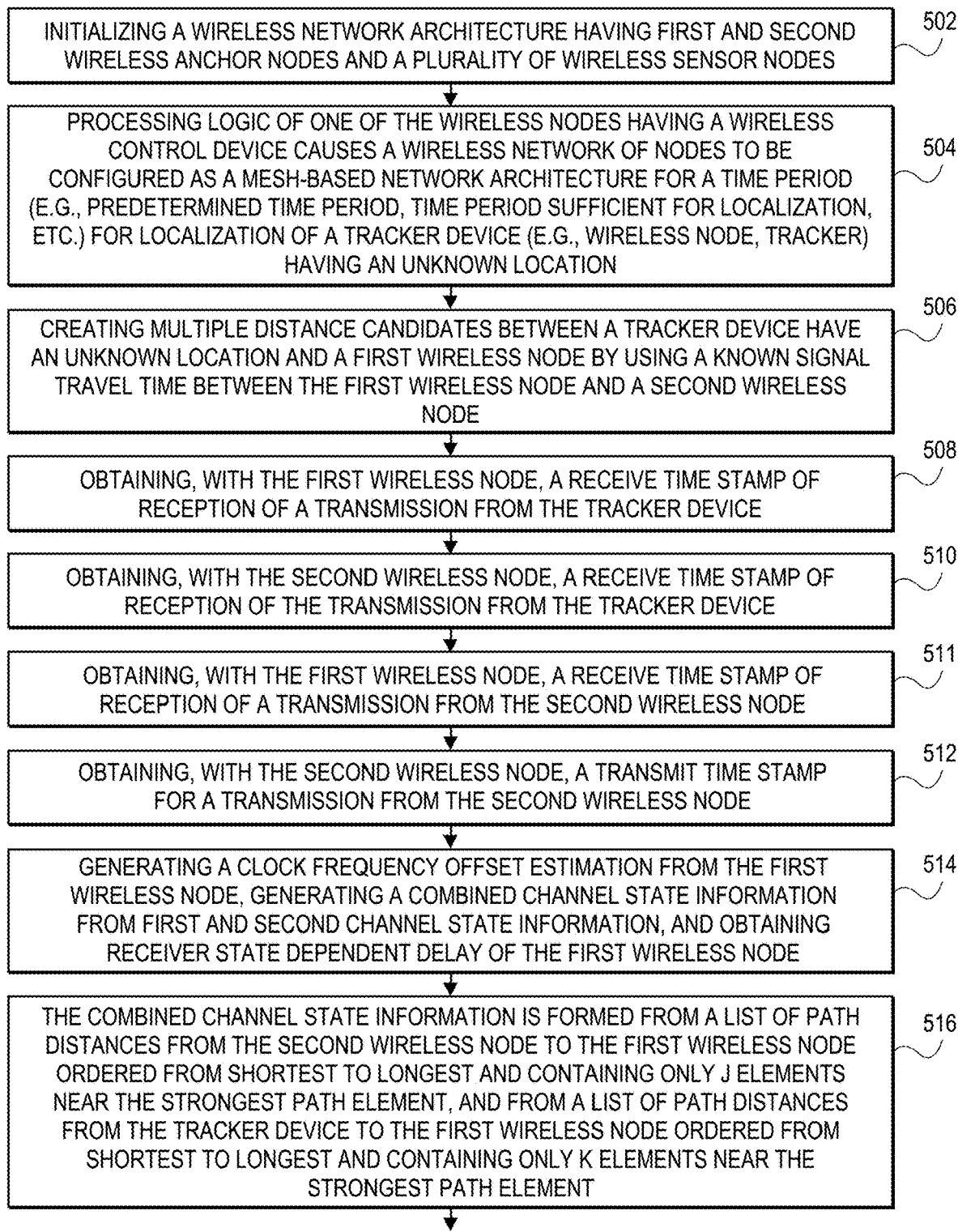
FIGS. 5A-5C illustrate a method for performing a TDoA ranging for localization in accordance with another embodiment.
Figure 5B:
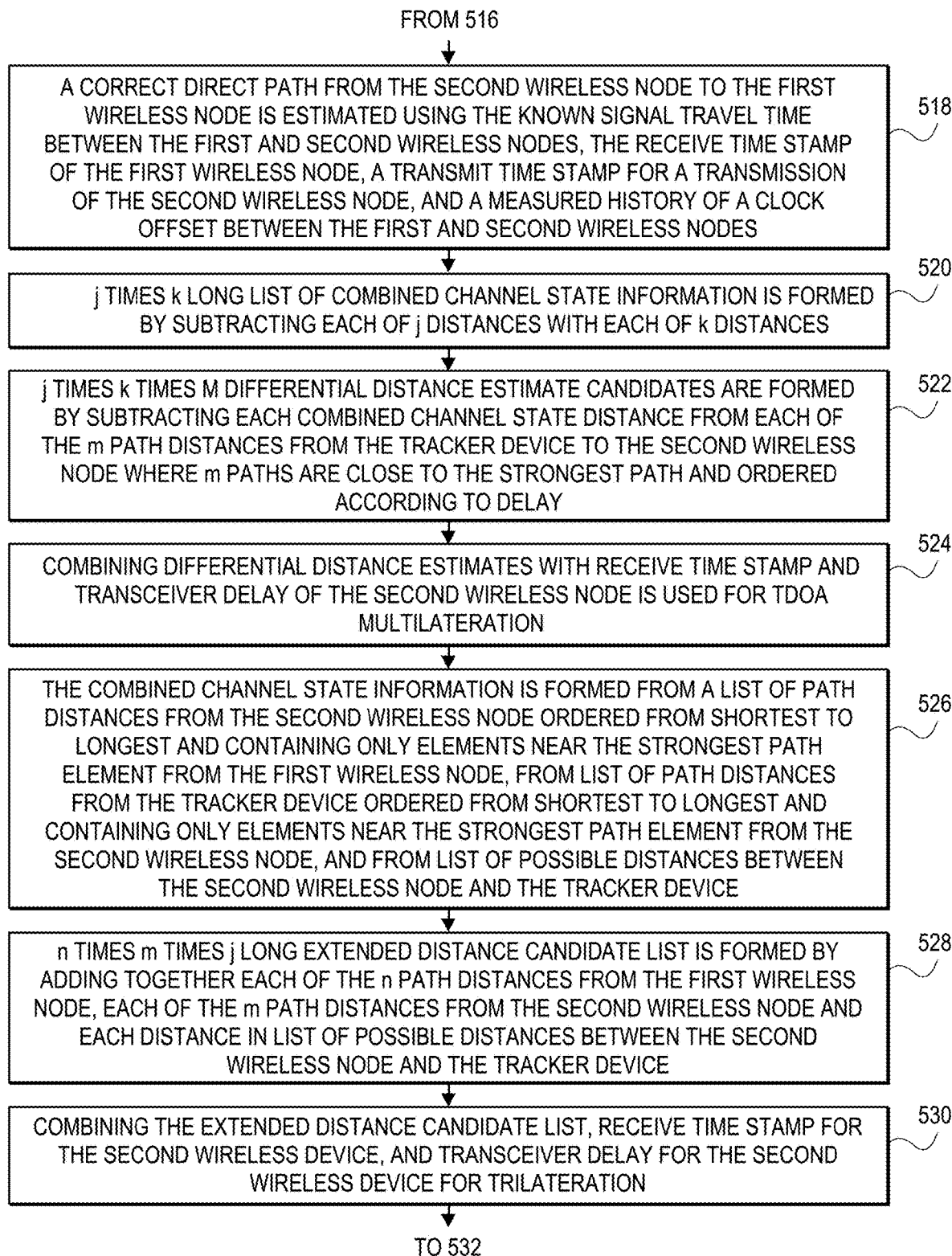
Figure 5C:
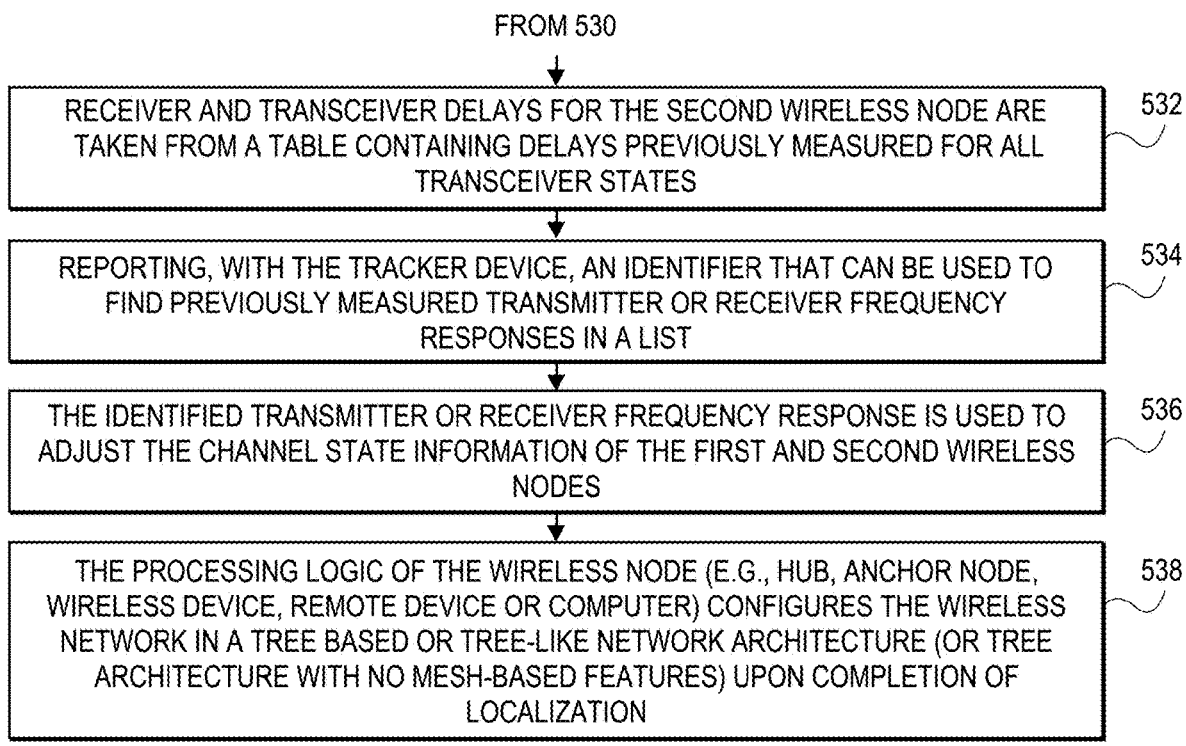

FIGS. 5A-5C illustrate a method for performing a TDoA ranging for localization as discussed in conjunction with the description of FIGS. 4A and 4B in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture. Any of the parameters (e.g., time stamps, receiver delays, transceiver delays, CSI, etc.) determined for a first wireless node or a second wireless node of an operation can also be determined for both of the first and second wireless nodes or any of the wireless nodes of the wireless network architecture.

At operation 502, the method includes initializing a wireless network architecture having first and second wireless anchor nodes and a plurality of wireless sensor nodes. At operation 504, processing logic of one of the wireless nodes having a wireless control device causes a wireless network of nodes to be configured as a mesh-based network architecture for a time period (e.g., predetermined time period, time period sufficient for localization, etc.) for localization of a tracker device (e.g., wireless node, tracker) having an unknown location. In one example, the wireless network is configured as a tree-like low power network in combination with a temporary mesh-based network.

At operation 506, the method includes creating multiple distance candidates between a tracker device having an unknown location and a first wireless node by using a known signal travel time between the first wireless node and a second wireless node. At operation 508, the method includes obtaining, with the first wireless node, a receive time stamp of reception of a transmission from the tracker device.

At operation 510, the method includes obtaining, with the second wireless node, a receive time stamp of reception of the transmission from the tracker device. At operation 511, the method includes obtaining, with the first wireless node, a receive time stamp of reception of a transmission from the second wireless node. At operation 512, the method includes obtaining, with the second wireless node, a transmit time stamp for a transmission from the second wireless node. At operation 514, the method includes generating a clock frequency offset estimation from the first wireless node, obtaining a first channel state information from the first wireless node receiving a transmission from the tracker device, obtaining a second channel state information from the first wireless node receiving a transmission from the second wireless node, generating a combined channel state information from the first and second channel state information from reception of the transmissions from the tracker device and the second wireless node and obtaining receiver state dependent delay of the first wireless node (or obtaining receiver state dependent delay of the first and second wireless nodes). Carrier frequency offset estimation is an integral part of a digital receiver. Typically, carrier frequency offset is measured from a dedicated training signal, like WiFi Short/Long Training Symbols. Since the carrier and symbol clock are typically derived from the same source, then any measured carrier frequency offset can be assumed to be found in the clock used for the time stamps too. A clock frequency offset estimation between the first and second wireless nodes includes a clock and carrier frequency offset. Receivers typically have different operating states depending on e.g. on the incoming signal strength and gain settings. These states can introduce additional delay (e.g., receiver state dependent delay of the first wireless node, receiver state dependent delay of the second wireless node) that can be taken into account when estimating the distances.

At operation 516, the combined channel state information is formed from a list of path distances from the second wireless node to the first wireless node ordered from shortest to longest and containing only j elements near the strongest path element, and from a list of path distances from the tracker device to the first wireless node ordered from shortest to longest and containing only k elements near the strongest path element.

At operation 518, a correct direct path from the second wireless node to the first wireless node is estimated using the known signal travel time between the first and second wireless nodes, the receive time stamp of the first wireless node, a transmit time stamp for a transmission of the second wireless node, and a measured history of a clock offset between the first and second wireless nodes.

At operation 520, j times k long list of combined channel state information is formed by subtracting each of j distances from each of k distances.

At operation 522, j times k times m differential distance estimate candidates are formed by subtracting each combined channel state distance from each of the m path distances from the tracker device to the second wireless node where m paths are close to the strongest path and ordered according to delay. In one example, some of the distance estimate candidates are removed when the distance estimate candidates are not between predetermined limits. The predetermined limits are calculated from the known locations of the first and second wireless nodes and from a shape of a space where the tracker device is known to be.

At operation 524, combining differential distance estimates with receive time stamp and transceiver delay of the second wireless node (or transceiver delay of the first and second wireless nodes) is used for TDoA multilateration. In one example, j times k plus m paths together with the times stamps are used in multilateration. The multilateration finds multiple possible locations and corresponding multiple clock offsets between the tracker device and the first wireless node and wherein one location is selected that matches (e.g., best matches) a clock offset with a distance between the known location of the first wireless node and a possible location of the tracker device. The distance estimate candidates in multilateration are weighted based on previously determined reliability metrics.

At operation 526, the combined channel state information is formed from a list of path distances from the second wireless node ordered from shortest to longest and containing only elements near the strongest path element from the first wireless node, from list of path distances from the tracker device ordered from shortest to longest and containing only elements near the strongest path element from the second wireless node, and from list of possible distances between the second wireless node and the tracker device.

At operation 528, n times m times j long extended distance candidate list is formed by adding together each of the n path distances from the first wireless node, each of the m path distances from the second wireless node and each distance in list of possible distances between the second wireless node and the tracker device.

At operation 530, the method further includes combining the extended distance candidate list, receive time stamp for the second wireless device, and transceiver delay for the second wireless device (or transceiver delays of the first and second wireless nodes) for trilateration.

At operation 532, the method further includes receiver and transceiver delays for the second wireless node (or receiver and transceiver delays of the first and second wireless nodes) that are taken from a table containing delays previously measured for all transceiver states.

At operation 534, the method further includes reporting, with the tracker device, an identifier that can be used to find previously measured transmitter or receiver frequency responses in a list. At operation 536, the identified transmitter or receiver frequency response is used to adjust the channel state information of the first and second wireless nodes.

At operation 538, the processing logic of the wireless node (e.g., hub, anchor node, wireless device, remote device or computer) configures the wireless network in a tree based or tree-like network architecture (or tree architecture with no mesh-based features) upon completion of localization of the tracking device. The temporary mesh-based features are terminated or disabled upon completion of localization.

Figure 6A:
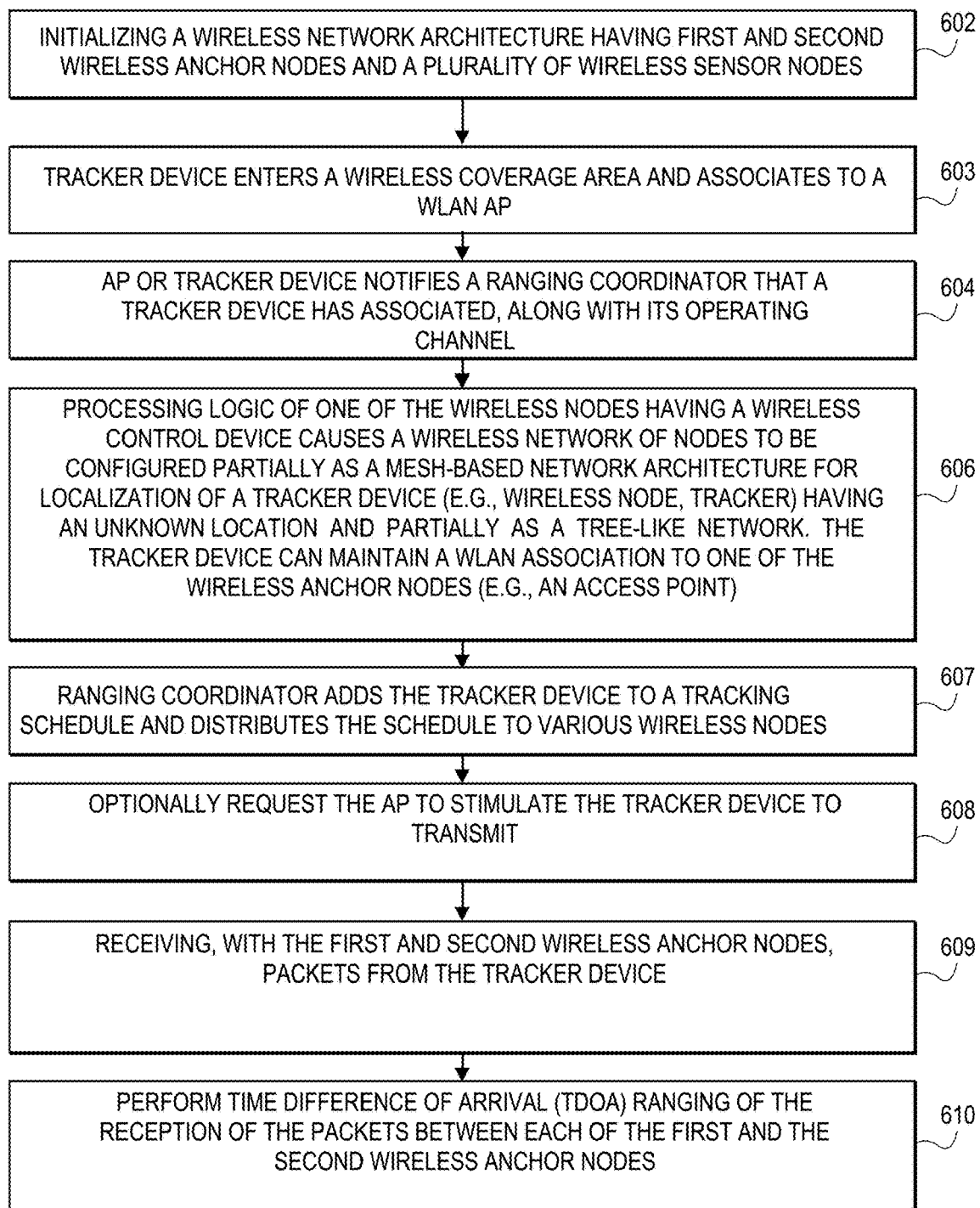
FIGS. 6A-6B illustrates a method for monitoring a tracker device in a WiFi context in accordance with one embodiment.
Figure 6B:
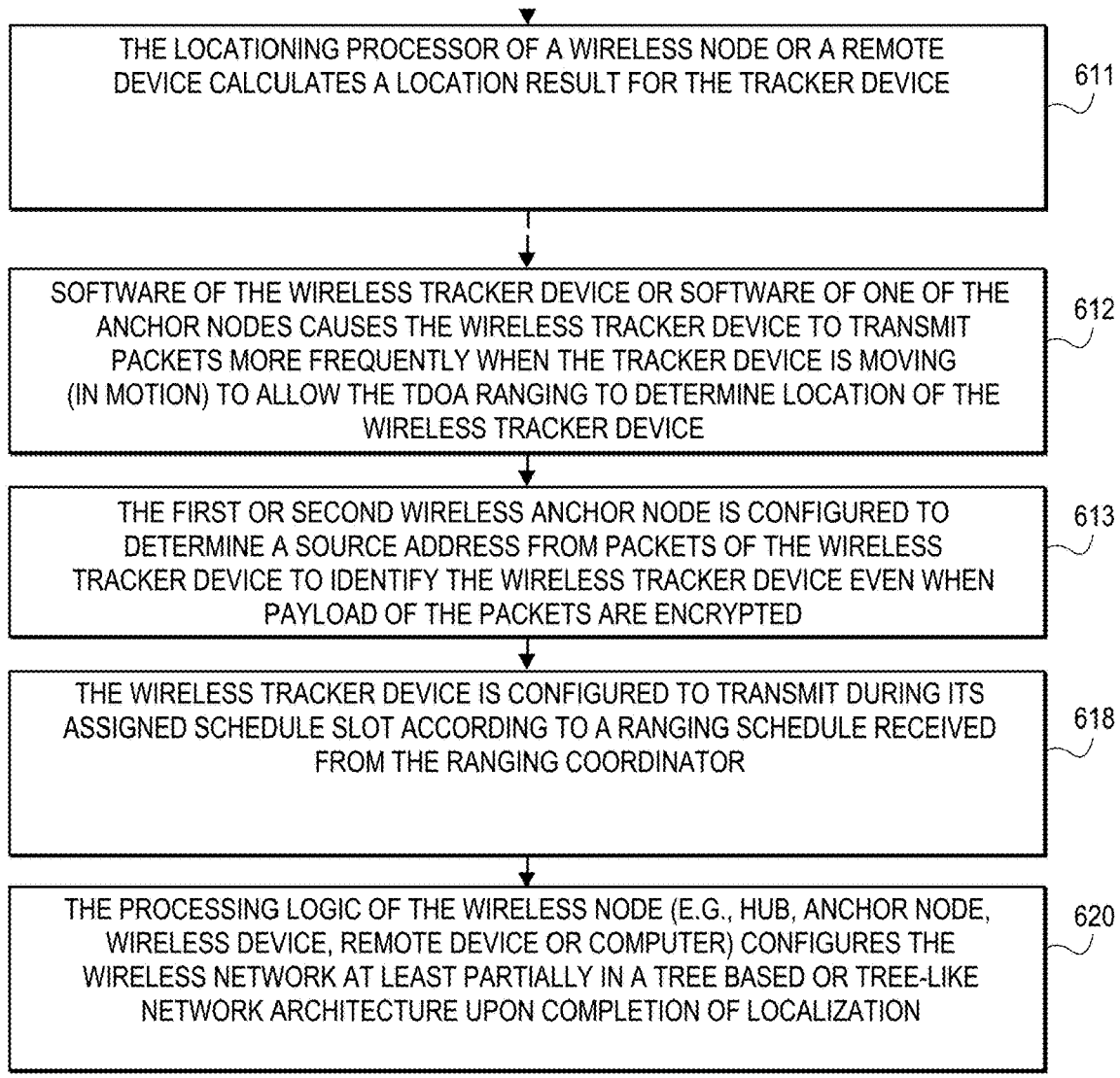

Since the existence of the sniffers need not be known by the tracker or by devices it is communicating with, it is possible to implement TDoA using devices not aware of TDoA. Aspects of the present invention may be utilized to track a device in a wireless local area network (WLAN) context. FIG. 6 illustrates a method for monitoring a tracker device in a WLAN (e.g., IEEE 802.11, WiFi) context in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

At operation 602, the method includes initializing a wireless network architecture having first and second wireless anchor nodes and a plurality of wireless sensor nodes. In one example, the wireless network is configured as a tree-like network.

At operation 603, a tracker device enters a wireless coverage area of the wireless network architecture and associates to a WLAN access point (AP), which can be one of the anchor nodes. At operation 604, the AP or tracker device notifies a ranging coordinator that a tracker device has associated, along with its operating channel. At operation 606, processing logic of one of the wireless nodes having a wireless control device causes a wireless network of nodes to be configured partially as a mesh-based network architecture for localization of the tracker device (e.g., wireless node, tracker) having an unknown location and partially as a tree-like network. In one example, the wireless network is configured as a tree-like network in combination with a mesh-based network. The sniffing anchor nodes can be considered part of a mesh network and the AP and the tracker device being located can be considered part of a tree network. The mesh network is sniffing transmissions from the tree network and the mesh network may be configured to continuously sniff/receive packets from the tracker device.

At operation 607, the ranging coordinator adds the tracker device to a tracking schedule and distributes the schedule to various nodes. In one example, the ranging coordinator receives channel update information from the wireless tracker arbitrary device and any other wireless arbitrary devices and distributes a ranging schedule to the wireless nodes (e.g., wireless tracker device and first and second wireless anchor nodes). The first or second wireless anchor node will change to the operating channel of the wireless tracker device when packets are being transmitted for ranging. At operation 608, the ranging coordinator can optionally request the AP to stimulate the tracker device to transmit; alternatively or additionally, the ranging coordinator can directly request the tracker to transmit. The tracker device may also use an internal event (e.g., timer or sensor) to trigger transmission.

At operation 609, the method includes receiving, with the first and second wireless anchor nodes, packets from the tracker device. When the tracker device transmits any packet, the anchor nodes may sniff the packet transmissions and measure, define or calculate their associated timestamps and CSI, and relay ranging data to a locationing processor.

At operation 610, the method performs time difference of arrival (TDoA) ranging of the reception of the packets between each of the first and the second wireless anchor nodes. At operation 611, the locationing processor of a wireless node or a remote device calculates a location result for the tracker device.

At operation 612, software of the wireless tracker device or software of one of the anchor nodes causes the wireless tracker device to transmit packets more frequently when the tracker device is moving (in motion) to allow the TDoA ranging to determine location of the wireless tracker device.

At operation 613, the first or second wireless anchor node is configured to determine a source address (e.g., MAC address) from packets of the wireless tracker device to identify the wireless tracker device even when payload of the packets are encrypted. At operation 618, the wireless tracker device may be configured to transmit during its assigned schedule slot according to a ranging schedule received from the ranging coordinator.

At operation 620, the processing logic of the wireless node (e.g., hub, anchor node, wireless device, remote device or computer) configures the wireless network at least partially in a tree based or tree-like network architecture upon completion of localization. The mesh-based features can be continuous or temporary.

In one embodiment, the tracker device can be any arbitrary WLAN (e.g., OFDM WiFi) device maintaining a WLAN (e.g., WiFi) association to an arbitrary AP. The tracker will transmit packets to the AP when the tracker has data to send and additionally keep-alive packets to maintain its association. Any and all of these packets may be used for TDOA ranging. Software on the tracker can be used to ensure that the tracker transmits frequently enough when in motion such that TDOA ranging can track movements. Alternatively or additionally, software protocols on the AP (or other parts of the network) can stimulate the tracker to transmit more frequently or at a specific time. Current WiFi standards require that the source MAC address of the tracker will be constant for at least the life of the association. The source address can be used to distinguish trackers and the payload of the tracker packets may be encrypted (since it has no impact to TDOA ranging).

In another embodiment, it is also possible to perform TDoA on arbitrary devices that are not WLAN associated with the AP. The arbitrary device sends probe request packets to discover networks that are available. TDoA can be done on these probe request packets sent by devices that aren't WLAN associated or may be associated to a different network.

TDoA requires all anchors participating in the ranging to be tuned to the tracker's channel when the tracker transmits for ranging. Larger WiFi AP deployments typically utilize many channels, therefore anchors split time across multiple channels in order to monitor all trackers. A Ranging Coordinator software function may be used to coordinate activities of trackers and anchors. In one example, all devices need a global time reference, such as network time protocol (NTP). In such a system, the Ranging Coordinator will: (1) receive channel update information from trackers and (2) distribute a ranging schedule to trackers and anchors. The trackers will: (1) report any association or channel changes to the coordinator and (2) receive schedule updates from the coordinator and ensure that the tracker transmits during its assigned schedule slot. The anchors will receive schedule updates from the coordinator which specify the time, channel, and which trackers to search for/track.

Tracking of multiple nodes may be performed. In this case, various possible implementations are possible with a Ranging Coordinator. In one embodiment, the packets from nodes with unknown locations to be tracked are captured serially. In another embodiment, these are captured in parallel, for example, by using different channels or by ensuring sufficient spatial separation between transmitting nodes such that interference is minimized. More generally, by using multiple channels and exploiting the spatial separation and signal attenuation over these distances, it is possible to capture packets across multiple channels and multiple sources and build a comprehensive location map of multiple trackers simultaneously.

Since the existence of the sniffers need not be known by the tracker or by devices it is communicating with, it is possible to implement TDoA using devices not aware of TDoA and rather only aware of TOA-based ranging as is implemented in some existing and emerging WLAN (e.g., WiFi standards). One such embodiment is shown in FIG. 1.

In such a system, anchor functionality may or may not be integrated with regular WiFi AP function into the same wireless node. Anchors advertise support for fine time measurement (FTM) protocol Responder (e.g., using WiFi beacons and/or probe responses) as implemented in some existing and emerging WiFi standards such as 802.11mc and 802.11az. The FTM protocol provides a way for two wireless local area network (WLAN) devices to perform round trip time (RTT) and estimate a distance between each other. The FTM protocol is inclusive of all forms of WLAN RTT ranging (e.g., IEEE 802.11, 802.11mc, 802.11az, etc.). For implementation of TDoA, nearby anchors will all be tuned to the same channel simultaneously, either indefinitely or per a schedule. As described by the aforementioned standards, FTM Initiator-capable trackers (e.g., N440) scan for anchors (e.g., wireless nodes M410, S420, S430) and perform TOA ranging to these anchor nodes serially. To implement, TDoA, nearby anchors (e.g., S420, S430) receive (sniff) the TOA ranging interaction and data from all anchors is used to perform TDOA localization. A single TOA FTM ranging operation as embodied within existing and emerging WiFi standards can therefore produce a location result through TDoA, despite the fact that the devices being tracked may not/need not be aware of the performance of this TDoA operation.

It is possible to use novel aspects of the present disclosure herein to locate a tracker using arbitrary anchors. An example of such a wireless system is shown in FIG. 7.

Figure 7:
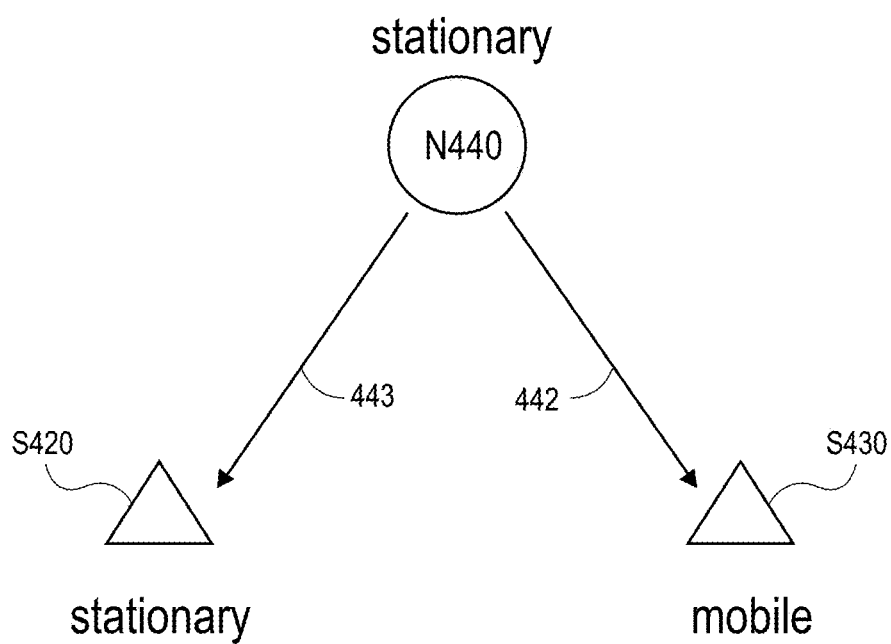
FIG. 7 illustrates a wireless system with arbitrary anchors to locate a tracker device in accordance with one embodiment.

To explain FIG. 7, the following definitions are first provided: (1) CSI-enabled device: a device capable of sniffing and collecting CSI and timestamps (shown as a triangle in FIG. 7). (2) Arbitrary device: any WLAN (e.g., OFDM WiFi) device (shown as circle) (3) Anchor: a stationary device (with known coordinates).

Any pair of CSI-enabled devices (S420, S430) can measure a TDOA range to an arbitrary device (N440), which is transmitting to any destination address (e.g., its associated AP); this range can be represented by a hyperbolic shape. In one example, the pair of CSI-enabled devices must be time synchronized. TOA reference ranging can accomplish this using the techniques discussed above or using the techniques described in U.S. Pat. No. 10,757,675 and U.S. patent application Ser. No. 16/283,465, or other such techniques as would be apparent to one of ordinary skill in the art.

One of the CSI-enabled devices (S420) is an anchor. The other CSI-enabled device (S430) is a tracker with unknown location. The pair of CSI-enabled devices can measure TDOA ranges to multiple (3 or 4) arbitrary anchors (one such anchor is show in FIG. 7 as N440) one at a time. The ranges can be used with various triangulation methods to determine the location of the tracker, such as discussed in U.S. Pat. No. 10,757,675 and U.S. patent application Ser. No. 16/283,465 or other such techniques as would be apparent to one of ordinary skill in the art.

Arbitrary anchors transmit with sufficient frequency to enable the tracking operation. This can be achieved using the aforementioned scheduling techniques, or other such techniques as would be apparent to one of ordinary skill in the art. For example, S420 can stimulate anchors to transmit if it is associated to the same network.

To determine the absolute or relative location of the object to be tracked, it is necessary to know the location of the anchors, either in terms of absolute physical location or in terms of relative location with respect to each other. In one embodiment, the user can place the anchors in exact known locations and make this information available to the triangulation algorithms.

Figure 8:
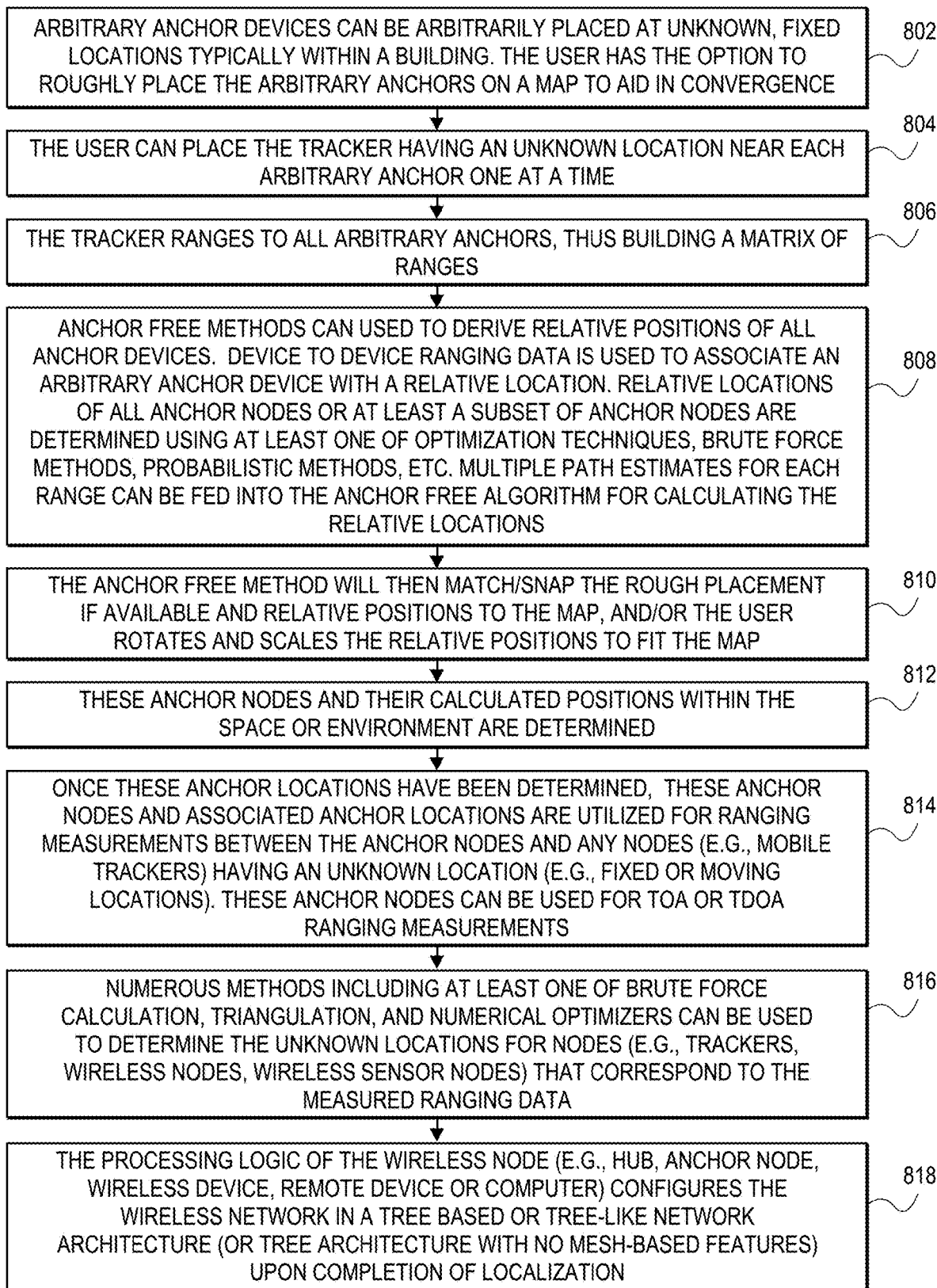
FIG. 8 illustrates an anchor free method for localization of wireless devices of a wireless sensor network in accordance with one embodiment.

In another embodiment, anchor free localization (e.g., brute force search, exhaustive search, triangulation, numerical optimizers, probabilistic methods, linear algebra solution, incremental methods, etc.) can be used, such as described in U.S. patent application Ser. No. 16/283,478 or other such techniques as would be apparent to one of ordinary skill in the art. FIG. 8 illustrates an anchor free method for localization of wireless devices of a wireless sensor network in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

At operation 802, arbitrary anchor devices can be arbitrarily placed at unknown, fixed locations typically within a building. The user has the option to roughly place the arbitrary anchors on a map to aid in convergence. At operation 804, the user can place the tracker having an unknown location near each arbitrary anchor one at a time. At operation 806, the tracker ranges to all arbitrary anchors, thus building a matrix of ranges in which the Anchor Free methods at operation 808 can used to derive relative positions of all anchor devices. Device to device ranging data is used to associate an arbitrary anchor device with a relative location. Relative locations of all anchor nodes or at least a subset of anchor nodes are determined using at least one of optimization techniques, brute force methods, probabilistic methods, etc. Multiple path estimates for each range can be fed into the anchor free algorithm for calculating the relative locations.

At operation 810, the anchor free method will then match/snap the rough placement if available and relative positions to the map, and/or the user rotates and scales the relative positions to fit the map. The rotation, translation, and mirroring of a full set of relative positions are adjusted to align them to a physical description of the space or environment (e.g., floorplan, map, etc). Machine learning, artificial intelligence, or a user may perform these adjustments. In one example, machine learning generates a likely set of orientations for relative positions with respect to the space or environment and then a user selects one of the orientations. These adjustments place the anchor positions in the coordinate system of the space or environment. At operation 812, these anchor nodes and their calculated positions within the space or environment are determined.

Once these anchor locations have been determined, at operation 814 these anchor nodes and associated anchor locations are utilized for ranging measurements between the anchor nodes and any nodes (e.g., mobile trackers) having an unknown location (e.g., fixed or moving locations). These anchor nodes can be used for ToA or TDoA ranging measurements. At operation 816, numerous methods including at least one of brute force calculation, triangulation, and numerical optimizers can be used to determine the unknown locations for nodes (e.g., trackers, wireless nodes, wireless sensor nodes) that correspond to the measured ranging data. At operation 818, the processing logic of the wireless node (e.g., hub, anchor node, wireless device, remote device or computer) configures the wireless network in a tree based or tree-like network architecture (or tree architecture with no mesh-based features) upon completion of localization. Processing logic of the wireless node having a wireless control device causes a wireless network of nodes to be configured as a mesh-based network architecture for a time period (e.g., predetermined time period, time period sufficient for localization, etc.) for localization of at least one wireless device (e.g., wireless node, tracker) having an unknown location. In one example, the wireless network is configured as a tree-like low power network in combination with a temporary mesh-based network.

Although the operations in the computer-implemented methods of FIGS. 5A-5C, 6A-6B, and 8 are shown in a particular order, the order of the actions can be modified. Thus, the illustrated embodiments can be performed in a different order, and some operations may be performed in parallel. Some of the operations listed in FIGS. 5A-5C, 6A-6B, and 8 may be optional in accordance with certain embodiments. The numbering of the operations presented is for the sake of clarity and is not intended to prescribe an order of operations in which the various operations must occur. Additionally, operations from the various flow diagrams may be utilized in a variety of combinations.

In another embodiment, fingerprint-based set-up and localization may be used. During setup of the system, the user places the tracker near various locations of interest in the home (e.g., the center of each room) one at a time. The tracker ranges to all arbitrary anchors and the system records these ranges along with the name of the location of interest. During normal operation: the location algorithm searches for a match between the current location and a location of interest and the location result is presented as proximity (or not) to a location of interest (rather than coordinates on a map).

In one embodiment, the baseband hardware of a transceiver of a wireless node allows full duplex operation. In this case, the signal can be transmitted and then immediately received after going through the transmit and receive chains. The CSI, transmit, and receive timestamps are combined to generate a calibration profile for the hardware of any wireless node. The delay can be extracted and removed directly or the frequency response of the hardware itself can be removed from subsequent measurements.

In another embodiment, the baseband hardware of a transceiver of a wireless node is not full duplex. In this case the transmit packet can be generated independently from the baseband. The raw data for a packet can be stored in memory and read out directly to a digital-to-analog converter (DAC). It goes through the transmit (TX) and receive (RX) RF chains as before. The baseband is set to be in receive mode and can capture the CSI and timestamp of the incoming packet. The CSI, transmit, and receive timestamps can be used as in the previous case. The transmit timestamp needs to be captured at the time the memory readout to the DAC is triggered.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention.

Figures 9A, 9B:
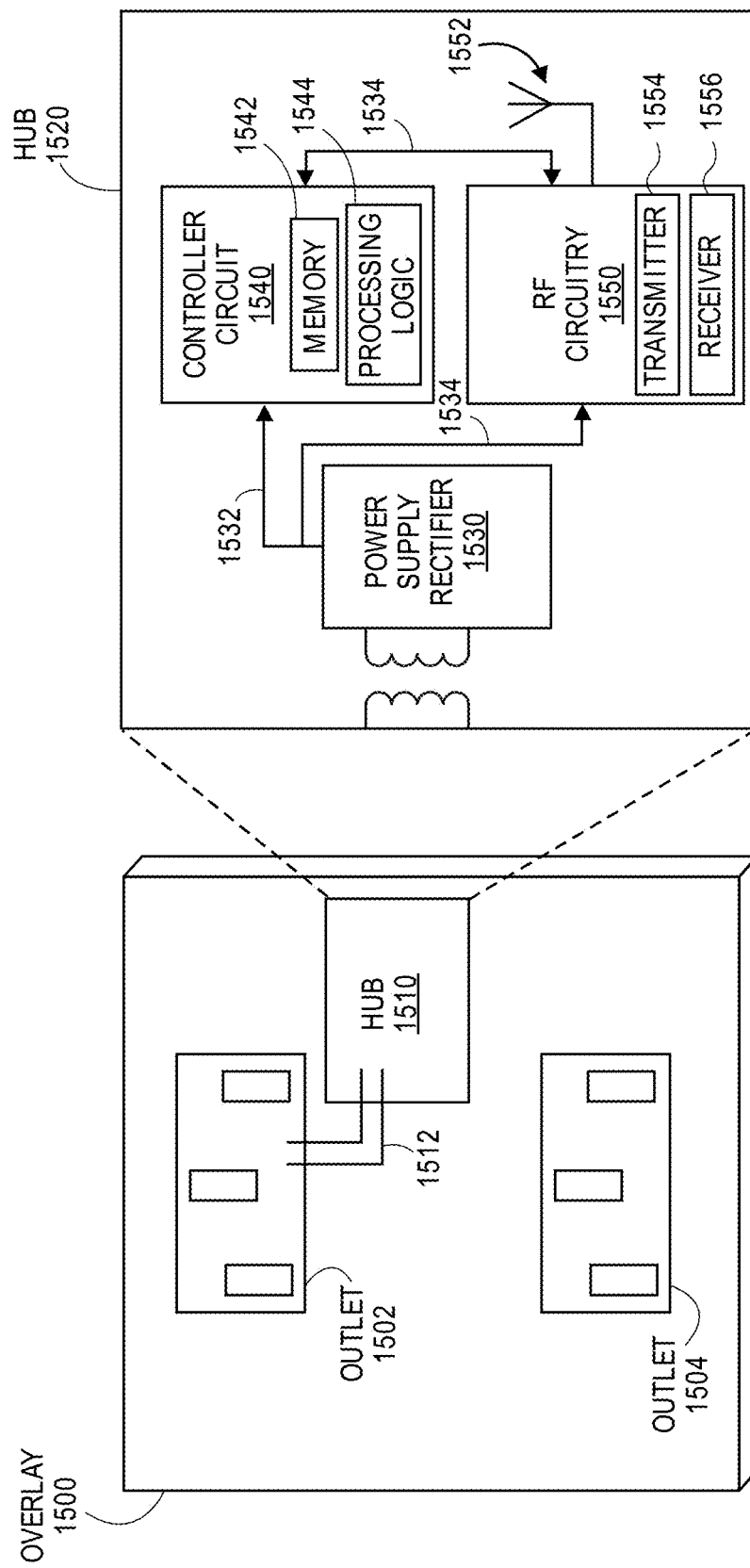
FIG. 9A shows an exemplary embodiment of a hub implemented as an overlay 1500 for an electrical power outlet in accordance with one embodiment.
FIG. 9B shows an exemplary embodiment of an exploded view of a block diagram of a hub implemented as an overlay for an electrical power outlet in accordance with one embodiment.

FIG. 9A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 9B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 10B:
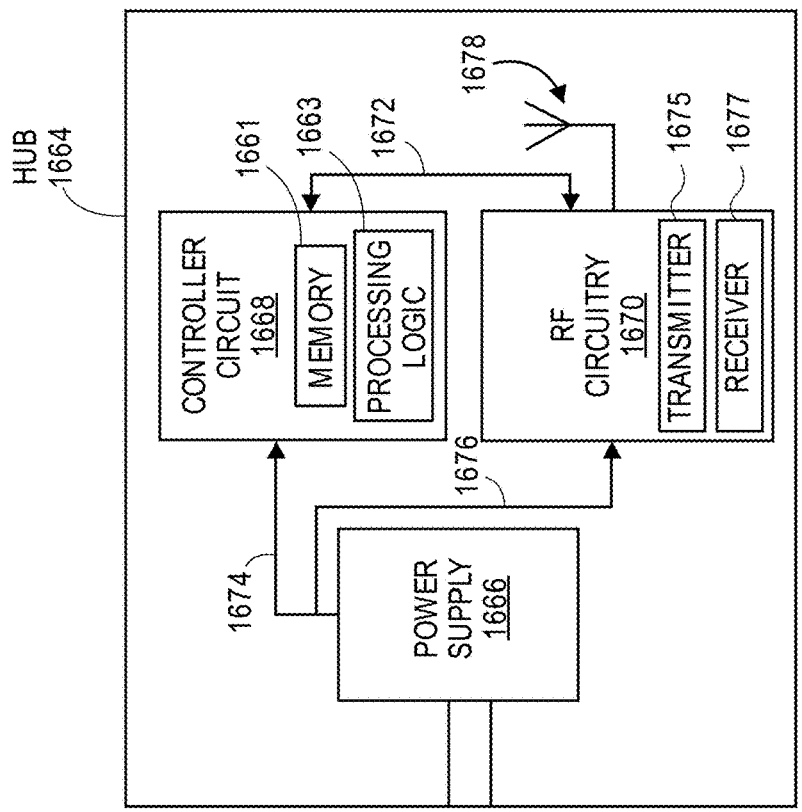
FIG. 10B shows an exemplary embodiment of a block diagram of a hub 964 implemented as a card for deployment in a computer system, appliance, or communication hub in accordance with one embodiment.
Figure 10A:
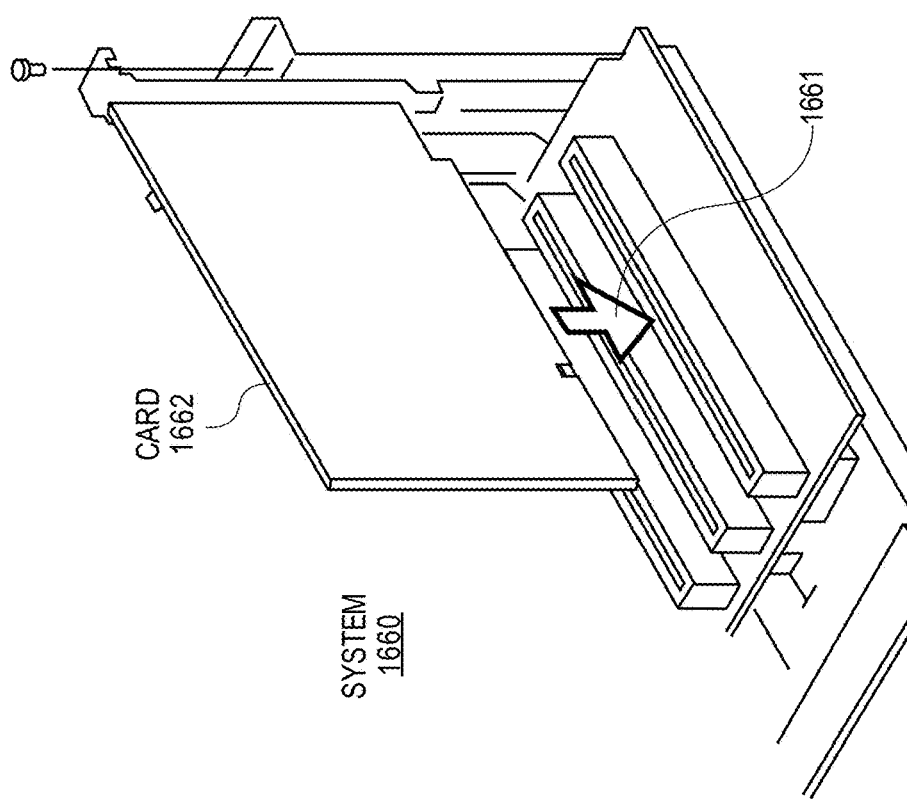
FIG. 10A shows an exemplary embodiment of a hub implemented as a card for deployment in a computer system, appliance, or communication hub in accordance with one embodiment.

FIG. 10A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1661.

FIG. 10B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 10C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 10D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a first wireless node includes a wireless device with one or more processing units and RF circuitry for transmitting and receiving communications in the wireless network architecture including a first RF signal having a first packet. A second wireless node includes a wireless device with a transmitter and a receiver to enable bi-directional communications with the first wireless node in the wireless network architecture including a second RF signal with a second packet. The one or more processing units of the first wireless node are configured to execute instructions to determine a round trip time estimate of the first and second packets, to determine channel state information (CSI) of the first and second wireless nodes, and to calibrate hardware to determine hardware delays of the first and second wireless nodes.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 11:
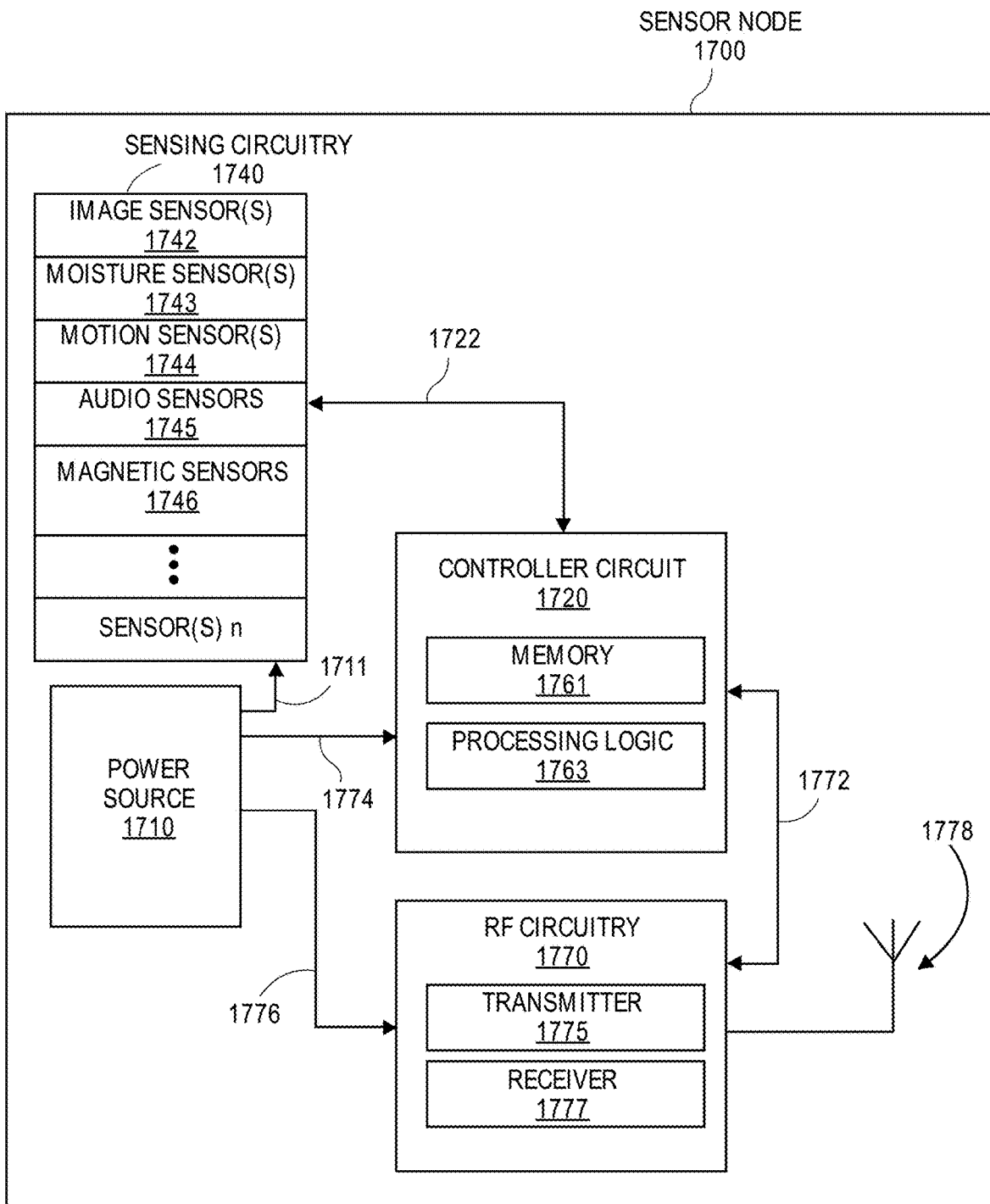
FIG. 11 illustrates a block diagram of a sensor node in accordance with one embodiment.

FIG. 11 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1711 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 12:
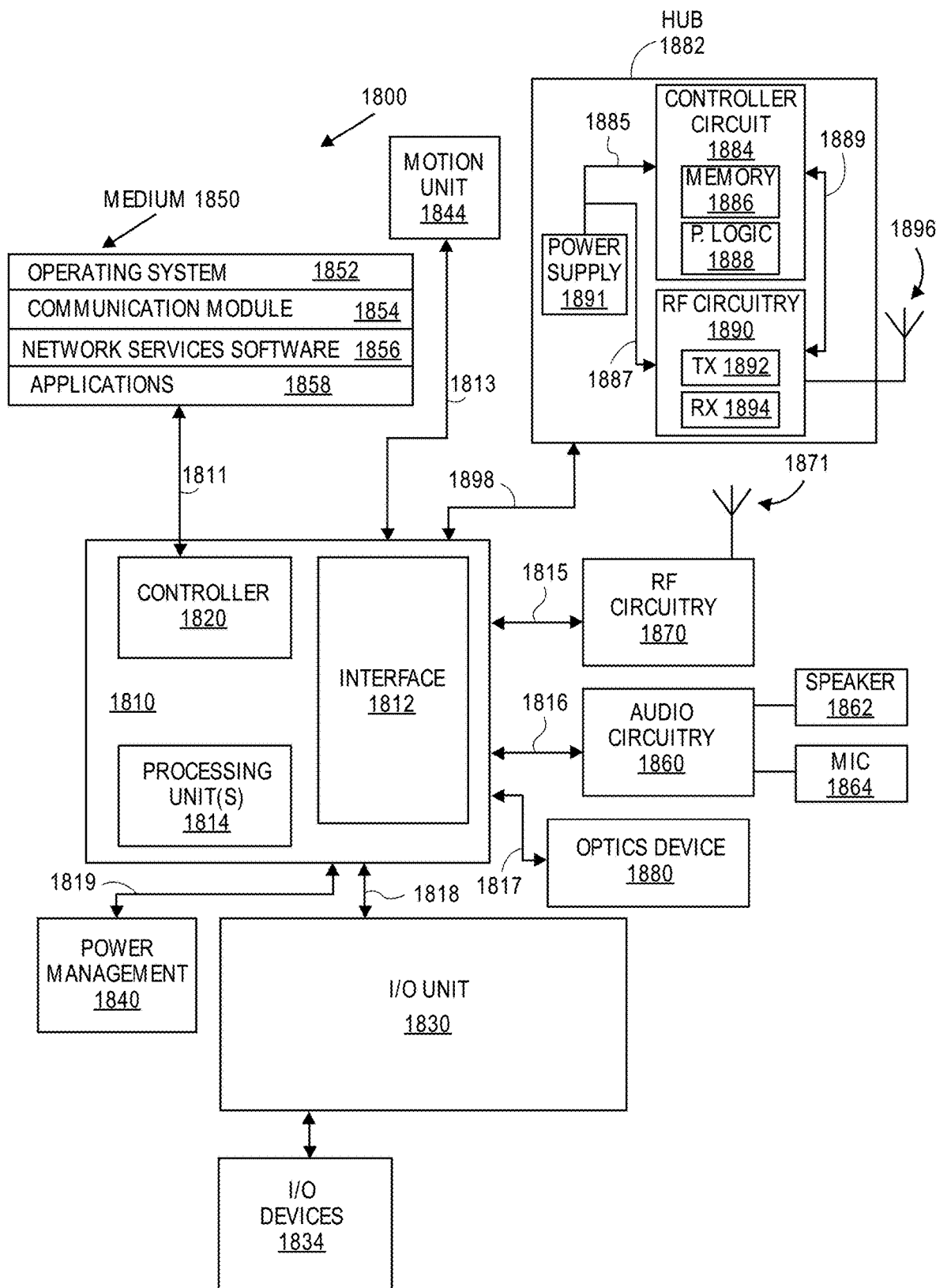
FIG. 12 illustrates a block diagram of a system or appliance 1800 having a hub in accordance with one embodiment.

FIG. 12 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 12 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Any of the following examples can be combined into a single embodiment or these examples can be separate embodiments. In one example of a first embodiment, an asynchronous system for localization of nodes in a wireless network architecture (e.g., wireless local area network (LAN), wireless wide area network (WAN), wireless cellular network) comprises a first and second wireless nodes with at least one wireless node each having a known locations and including a wireless device with one or more processing units and RF circuitry for transmitting and receiving communications in the wireless network architecture; and a third wireless node having an unknown location and including a wireless device with RF circuitry to enable communications with the first and the second wireless nodes in the wireless network architecture. The one or more processing units of the first wireless node are configured to execute instructions to receive a first communication from the third wireless node, to determine time difference of arrival (TDoA) information of the reception of the first communication between each of the first and the second wireless nodes, to determine TDoA ranging including a relative or absolute position of the third wireless node using the time difference of arrival information, to send a second communication with a synchronization packet received by the second wireless node, and to synchronize the first and second wireless nodes based on the second communication with the synchronization of the first and second wireless nodes being decoupled from the first communication.

In another example of the first embodiment, the one or more processing units of the first wireless node are configured to execute instructions to determine transmission and reception timestamps of the second communication, to determine channel state information of the synchronization packet to calculate a distance between the first and second wireless nodes from known locations of the first and second wireless nodes, wherein the synchronization of the first and second wireless nodes further comprises determining a clock drift of the first wireless node or the second wireless node.

In another example of the first embodiment, the synchronization of the first and second wireless nodes occurs less frequently than determining a relative or absolute position of the third wireless node.

In another example of the first embodiment, the synchronization of the first and second wireless nodes comprises calculation methods to determine absolute clock phase difference at time of synchronization and a rate of change of the absolute clock phase difference.

In another example of the first embodiment, the first wireless node has a first reference clock signal and the second wireless node has a second reference clock signal.

In another example of the first embodiment, the synchronization is performed on demand.

In another example of the first embodiment, the asynchronous wireless system further comprises a fourth wireless node to send an initial communication to the third wireless node.

In another example of the first embodiment, the third wireless node sends an initial communication to a fourth wireless node.

In another example of the first embodiment, a role of one of the first, second, or fourth wireless nodes is randomly or rotatably selected.

In another example of the first embodiment, a role of one of the first, second, or fourth wireless nodes is selected based on quality of wireless communications to other wireless nodes or location within the wireless network architecture.

In another example of the first embodiment, TDoA ranging activity is used to cause synchronization when synchronization is needed.

In another example of the first embodiment, the asynchronous wireless system further comprises a fifth wireless node having an unknown location and including a wireless device with RF circuitry to enable communications with other wireless nodes in the wireless network architecture, wherein the one or more processing units of the first wireless node are configured to execute instructions to receive a third communication from the fifth wireless node, to determine time difference of arrival information of the reception of the fifth communication between each of the first and the second wireless nodes, to determine ranging including a relative or absolute position of the fifth wireless node using the time difference of arrival information.

In another example of the first embodiment, packets from the third and fifth wireless nodes are captured serially.

In another example of the first embodiment, the asynchronous wireless system, further comprises a fifth wireless node having an unknown location and including a wireless device with RF circuitry to enable communications with other wireless nodes in the wireless network architecture. Packets from the third and fifth wireless nodes are captured in parallel by using a first RF channel to capture packets from the third wireless node and a second different RF channel to capture packets from the fifth wireless node.

In another example of the first embodiment, the packets captured across the first and second RF channels are used to build a comprehensive location map of the third and fifth wireless nodes simultaneously.

In another example of the first embodiment, packets from the third and fifth wireless nodes are captured in series during a first time period and in parallel during a second time period depending on network conditions within the wireless network architecture.

In another example of the first embodiment, one of the first and second wireless nodes is a third party device.

In another example of the first embodiment, the first wireless node sends addressed synchronization packets to anchor nodes individually or sends the synchronization packets with no addressing to all anchor nodes.

In another example of the first embodiment, the first wireless node sends a packet to the third wireless node and this packet is received by the second wireless node and used for synchronization.

In another example of the first embodiment, this packet in combination with the second wireless node receiving packets between the first wireless node and the third wireless node provides contention free transmission and no overhead due to synchronization being performed with an acknowledgement packet.

In another example of the first embodiment, the first wireless node and the third wireless node are configured to support fine time measurement (FTM) protocol and FTM packets.

In one example of a second embodiment, a computer implemented method for localization of nodes in a wireless network architecture (e.g., wireless local area network (LAN), wireless wide area network (WAN), wireless cellular network) comprises initializing the wireless network architecture having first and second wireless nodes with at least one wireless node each having a known location. Each wireless node includes a wireless device with one or more processing units and RF circuitry for transmitting and receiving communications in the wireless network architecture. The method further includes receiving a first communication from a third wireless node having an unknown location, determining time difference of arrival (TDoA) information upon reception of the first communication between each of the first and the second wireless nodes, determining TDoA ranging including a relative or absolute position of the third wireless node using the time difference of arrival information, sending a second communication with a synchronization packet that is received by the second wireless node, and synchronizing the first and second wireless nodes based on the second communication with the synchronization of the first and second wireless nodes being decoupled from the first communication.

In another example of the second embodiment, the method further includes determining transmission and reception timestamps of the second communication, determining channel state information of the synchronization packet to calculate a distance between the first and second wireless nodes from known locations of the first and second wireless nodes. The synchronization of the first and second wireless nodes further comprises determining a clock drift of the first wireless node or the second wireless node.

In one example of a third embodiment, a computer implemented method for localization of a wireless arbitrary device in a wireless network architecture, comprises initializing the wireless network architecture having first and second wireless anchor nodes and a plurality of wireless sensor nodes, preparing, with the plurality of wireless anchor nodes, for localization of the wireless arbitrary device that performs wireless local area network (WLAN) active scanning or maintains a WLAN association to any node. The method further includes receiving, with the first and second wireless anchor nodes, packets from the wireless arbitrary device and performing time difference of arrival (TDoA) ranging upon reception of the packets between each of the first and the second wireless anchor nodes.

In another example of the third embodiment, software of the wireless arbitrary device or software of its associated WLAN access point (AP) or software of the first wireless anchor node to cause the wireless arbitrary device to transmit packets more frequently when in motion to allow the TDoA ranging to determine location of the wireless arbitrary device.

In another example of the third embodiment, the wireless anchor nodes are configured to determine a source address from packets of the wireless arbitrary device to identify the wireless arbitrary device even when payload of the packets are encrypted.

In another example of the third embodiment, the first or second wireless anchor nodes comprise a ranging coordinator to tune the first and second wireless anchor nodes to a RF channel of the wireless arbitrary device when packets are being transmitted for ranging.

In another example of the third embodiment, the ranging coordinator to receive channel update information from the wireless arbitrary device and any other wireless arbitrary devices and to distribute a ranging schedule to the wireless arbitrary devices and first and second wireless anchor nodes.

In another example of the third embodiment, the wireless arbitrary device or its associated WLAN AP is configured to report any network association or channel changes to the range coordinator, to receive schedule updates from the range coordinator and ensure that the wireless arbitrary device transmits during its assigned schedule slot.

In one example of a fourth embodiment, a computer implemented method for anchor free localization of wireless nodes in a wireless network architecture, comprises arbitrarily positioning arbitrary anchor devices at unknown, fixed locations, positioning a mobile tracker having an unknown location near each arbitrary anchor device one at a time, ranging the mobile tracker to the arbitrary anchor devices to build a matrix of ranges between the mobile tracker and the arbitrary anchor devices, and utilizing an Anchor Free algorithm and the matrix of ranges to derive relative positions of the arbitrary anchor devices.

In another example of the fourth embodiment, the matrix of ranges includes device to device ranging data to associate an arbitrary anchor device with a relative position.

In another example of the fourth embodiment, the computer implemented method further comprises matching or snapping relative locations of the arbitrary anchor devices to a map, determining positions of the arbitrary anchor devices, performing ranging measurements between the arbitrary anchor devices and the mobile tracker having an unknown location, and determining location of the mobile tracker using ranging data from the ranging measurements.

In another example of the fourth embodiment, positioning a mobile tracker having an unknown location near each arbitrary anchor device one at a time further comprises placing the mobile tracker near various locations of interest in a building one at a time.

In another example of the fourth embodiment, the computer implemented method further comprises recording ranges between the arbitrary anchor devices and the mobile tracker along with a name of the location of interest, during normal operation, searching for a match between a current location and a location of interest, and presenting a location result as proximity or not to a location of interest.

In one example of a fifth embodiment, a computer implemented method for a time difference of arrival (TDoA) ranging of wireless nodes in a wireless network architecture, comprises creating multiple distance estimate candidates between a tracker device have an unknown location and a first wireless node by using a known signal travel time between the first wireless node and a second wireless node, obtaining, with the first wireless node, a receive time stamp of reception of a transmission from the tracker device, obtaining, with the second wireless node, a receive time stamp of reception of the transmission from the tracker device, obtaining, with the first wireless node, a receive time stamp of reception of a transmission from the second wireless node, obtaining, with the second wireless node, a transmit time stamp for a transmission from the second wireless node and generating a clock frequency offset estimation from the first wireless node and a receiver state dependent delay of the first wireless node.

In another example of the fifth embodiment, the computer implemented method further comprises obtaining first channel state information of the first wireless node upon reception of the transmission from the tracker device, obtaining second channel state information of the first wireless node upon reception of the transmission from the second wireless node, and generating a combined channel state information based on the first and second channel state information from the reception of the transmissions from the tracker device and the second wireless node.

In another example of the fifth embodiment, the combined channel state information is formed from a list of path distances from the second wireless node to the first wireless node ordered from shortest to longest and containing only j elements near a strongest path element, and from a list of path distances from the tracker device to the first wireless node ordered from shortest to longest and containing only k elements near the strongest path element.

In another example of the fifth embodiment, a correct direct path from the second wireless node to the first wireless node is estimated using the known signal travel time between the first and second wireless nodes, the receive time stamp of the first wireless node, a transmit time stamp for a transmission of the second wireless node, and a measured history of a clock offset between the first and second wireless nodes.

In another example of the fifth embodiment, j times k long list of combined channel state information is formed by subtracting each of j distances from each of k distances.

In another example of the fifth embodiment, j times k times m differential distance estimate candidates are formed by subtracting each combined channel state distance from each of m path distances from the tracker device to the second wireless node where m paths are close to the strongest path element and ordered according to delay.

In another example of the fifth embodiment, some of the distance estimate candidates are removed when the distance estimate candidates are not between predetermined limits.

In another example of the fifth embodiment, predetermined limits are calculated from known locations of the first and second wireless nodes and from a shape of a space where the tracker device is known to be.

In another example of the fifth embodiment, combining differential distance estimates with receive time stamp and transceiver delay of the second wireless node is used for TDoA multilateration.

In another example of the fifth embodiment, where j times k plus m paths together with the time stamps are used in multilateration.

In another example of the fifth embodiment, the multilateration finds multiple possible locations and corresponding multiple clock offsets between the tracker device and the first wireless node and wherein one location is selected that matches a clock offset with a distance between the known location of the first wireless node and a possible location of the tracker device.

In another example of the fifth embodiment, the distance estimate candidates in multilateration are weighted based on previously determined reliability metrics.

In another example of the fifth embodiment, the combined channel state information is formed from a list of path distances from the second wireless node ordered from shortest to longest and containing only elements near a strongest path element from the first wireless node, from list of path distances from the tracker device ordered from shortest to longest and containing only elements near the strongest path element from the second wireless node, and from list of possible distances between the second wireless node and the tracker device.

In another example of the fifth embodiment, n times m times j long extended distance candidate list is formed by combining each of n path distances from the first wireless node, each of the m path distances from the second wireless node and each distance in list of possible distances between the second wireless node and the tracker device.

In another example of the fifth embodiment, the computer implemented method further comprises combining the extended distance candidate list, receive time stamp for the second wireless device, and transceiver delay for the second wireless device for trilateration.

In another example of the fifth embodiment, receiver and transceiver delays for the second wireless node are taken from a table containing delays previously measured for all transceiver states.

In another example of the fifth embodiment, the computer implemented method, further comprises reporting, with the tracker device, an identifier that can be used to find previously measured transmitter or receiver frequency responses in a list.

In another example of the fifth embodiment, the identified transmitter or receiver frequency response is used to adjust channel state information of the first and second wireless nodes.

The phrase "at least one of A and B" should be understood to mean "only A, only B, or both A and B." The phrase "at least one selected from the group of A and B" should be understood to mean "only A, only B, or both A and B." The phrase "at least one of A, B, or C" should be understood to mean "only A, only B, only C, or any combination of A, B, or C."

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for a time difference of arrival (TDoA) ranging of wireless nodes in a wireless network architecture, comprising:
    creating multiple distance estimate candidates between a tracker device have an unknown location and a first wireless node by using a known signal travel time between the first wireless node and a second wireless node;
    obtaining, with the first wireless node, a receive time stamp of reception of a transmission from the tracker device;
    obtaining, with the second wireless node, a receive time stamp of reception of the transmission from the tracker device;
    obtaining, with the first wireless node, a receive time stamp of reception of a transmission from the second wireless node; and
    generating a clock frequency offset estimation from the first wireless node and a receiver state dependent delay of the first wireless node.

2. The computer implemented method of claim 1, further comprising:
    obtaining first channel state information of the first wireless node upon reception of the transmission from the tracker device;
    obtaining second channel state information of the first wireless node upon
    reception of the transmission from the second wireless node; and
    generating a combined channel state information based on the first and second channel state information from the reception of the transmissions from the tracker device and the second wireless node.

3. The computer implemented method of claim 1, wherein a correct direct path from the second wireless node to the first wireless node is estimated using the known signal travel time between the first and second wireless nodes, the receive time stamp of the first wireless node, a transmit time stamp for a transmission of the second wireless node, and a measured history of a clock offset between the first and second wireless nodes.

4. The computer implemented method of claim 1, wherein some of the distance estimate candidates are removed when the distance estimate candidates are not between predetermined limits.

5. The computer implemented method of claim 4, wherein predetermined limits are calculated from known locations of the first and second wireless nodes and from a shape of a space where the tracker device is known to be.

6. The computer implemented method of claim 2, wherein the combined channel state information is formed from a list of path distances from the second wireless node ordered from shortest to longest and containing only elements near a strongest path element from the first wireless node, from list of path distances from the tracker device ordered from shortest to longest and containing only elements near the strongest path element from the second wireless node, and from list of possible distances between the second wireless node and the tracker device.

7. The computer implemented method of claim 1, wherein receiver and transceiver delays for the second wireless node are taken from a table containing delays previously measured for all transceiver states.

8. The computer implemented method of claim 1, further comprising:
    reporting, with the tracker device, an identifier that can be used to find previously measured transmitter or receiver frequency responses in a list.

9. The computer implemented method of claim 8, wherein the identified transmitter or receiver frequency response is used to adjust channel state information of the first and second wireless nodes.

* * * * *